US011076332B2

(12) United States Patent
Kato et al.

(10) Patent No.: US 11,076,332 B2
(45) **Date of Patent: *Jul. 27, 2021**

(54) WIRELESS TERMINAL AND BASE STATION SWITCHING METHOD

(71) Applicant: PANASONIC CORPORATION, Osaka (JP)

(72) Inventors: Osamu Kato, Fukuoka (JP); Noriyuki Shimizu, Kanagawa (JP); Masaaki Yoshino, Kanagawa (JP); Hideki Shingu, Tokyo (JP)

(73) Assignee: Panasonic Corporation, Osaka (JP)

( * ) Notice: Subject to any disclaimer, the term of this patent is extended or adjusted under 35 U.S.C. 154(b) by 147 days.

This patent is subject to a terminal disclaimer.

(21) Appl. No.: 16/469,005

(22) PCT Filed: Sep. 29, 2017

(86) PCT No.: PCT/JP2017/035597

§ 371 (c)(1),
(2) Date: Jun. 12, 2019

(87) PCT Pub. No.: WO2018/110033

PCT Pub. Date: Jun. 21, 2018

(65) Prior Publication Data

US 2019/0320374 A1 Oct. 17, 2019

(30) Foreign Application Priority Data

Dec. 13, 2016 (JP) ............................. JP2016-241260

(51) Int. Cl.
*H04W 36/32* (2009.01)
*H04W 24/08* (2009.01)
(Continued)

(52) U.S. Cl.
CPC ........... *H04W 36/32* (2013.01); *H04W 24/08* (2013.01); *H04W 36/08* (2013.01); *H04W 36/36* (2013.01); *H04W 72/10* (2013.01); *H04W 88/06* (2013.01)

(58) Field of Classification Search
CPC ..... H04W 24/08; H04W 36/08; H04W 36/32; H04W 36/36; H04W 48/16; H04W 72/02;
(Continued)

(56) References Cited

U.S. PATENT DOCUMENTS

2005/0221844 A1* 10/2005 Trethewey ............ H04W 4/029 455/456.6
2014/0071966 A1* 3/2014 Shikatani .............. H04W 76/15 370/336
(Continued)

FOREIGN PATENT DOCUMENTS

JP 2010-147519 A 7/2010
JP 2010-206543 A 9/2010
(Continued)

OTHER PUBLICATIONS

International Search Report, dated Nov. 21, 2017, for corresponding Japanese Application No. PCT/JP2017/035597, 5 pages (With English Translation).

*Primary Examiner* — Rina C Pancholi
(74) *Attorney, Agent, or Firm* — Seed IP Law Group LLP

(57) ABSTRACT

A wireless terminal that: for previous communications between the wireless terminal and base stations, stores as a communication history at least position information for the wireless terminal and information pertaining to each base station; acquires the position information for the wireless terminal and, on the basis of the position information for the wireless terminal and the stored communication history, derives from multiple base stations at least a connection subject base station to be used in data communication and a
(Continued)

connection standby base station, which is the base station having the next highest connection priority after the connection subject base station; and performs data communication when a trial connection with the connection subject base station has succeeded, and switches the connection subject base station to be used in data communication to the connection standby base station when communication with the connection subject base station is interrupted.

18 Claims, 10 Drawing Sheets

(51) Int. Cl.

| | |
|---|---|
| ***H04W 36/08*** | (2009.01) |
| ***H04W 36/36*** | (2009.01) |
| ***H04W 72/10*** | (2009.01) |
| ***H04W 88/06*** | (2009.01) |

(58) Field of Classification Search
CPC ..... H04W 72/10; H04W 88/06; H04W 48/20; H04W 84/10
See application file for complete search history.

(56) References Cited

U.S. PATENT DOCUMENTS

2014/0204925 A1* 7/2014 Otomo .................. H04W 68/04 370/338
2014/0213251 A1* 7/2014 Hasegawa ............. H04W 48/04 455/435.1
2015/0036521 A1* 2/2015 Minamino ............ H04W 48/16 370/252
2016/0135205 A1* 5/2016 Barbu ................... H04W 48/20 370/338
2018/0041945 A1 2/2018 Kato

FOREIGN PATENT DOCUMENTS

JP 2013-021516 A 1/2013
JP 2013/121670 A1 8/2013
JP 2014-241479 A 12/2014
JP 2016/170719 A1 10/2017

* cited by examiner

| i | 1 | 2 | 3 | 4 | 5 | 6 | 7 | 8 | ... | 97 | 98 | 99 | 100 |
|---|---|---|---|---|---|---|---|---|---|---|---|---|---|
| (X,Y,Z) | (X1, Y1, Z1) | (X2, Y2, Z2) | (X3, Y3, Z3) | (X4, Y4, Z4) | (X5, Y5, Z5) | (X6, Y6, Z6) | (X7, Y7, Z7) | (X8, Y8, Z8) | ... | (X97, Y97, Z97) | (X98, Y98, Z98) | (X99, Y99, Z99) | (X100, Y100, Z100) |
| m | 7 | 8 | 6 | 8 | 5 | 7 | 8 | 7 | ... | 7 | 5 | 9 | 3 |

| | | | | | | | | | | |
|---|---|---|---|---|---|---|---|---|---|---|
| i | 2 | 7 | 43 | 4 | 20 | 97 | 55 | 8 | 44 | 99 |
| di | 0.13 | 0.19 | 0.20 | 0.38 | 0.45 | 0.50 | 2.68 | 4.30 | 5.47 | 9.89 |
| m | 8 | 8 | 6 | 8 | 6 | 7 | 11 | 7 | 6 | 1 |

FIG. 6

| BASES STATION | ABREACTION | DESCRIPTION |
|---|---|---|
| CONNECTION SUBJECT BASE STATION | A | ACCESS |
| CONNECTION STANDBY BASE STATION | B | BACKUP |
| CONNECTION STANDBY CANDIDATE BASE STATION | C | CANDIDATE |
| BLOCKING-OCCURRING BASE STATION | D | DISCONNECT |

WIRELESS TERMINAL AND BASE STATION SWITCHING METHOD

TECHNICAL FIELD

The present disclosure relates to a wireless terminal and a base station switching method that determine and allocates a base station that is a communication partner at the time of wireless communication.

BACKGROUND ART

In a high frequency band (for example, a high Super High Frequency (SHF) band of 6 to 30 GHz or an Extremely High Frequency (EHF) band of 30 to 300 GHz) (the same is hereinafter true), which is currently assumed to be allocated to the 5th generation mobile communication system (5G), the ability of a radio wave to propagate in a straight line is enhanced. In this high frequency band, when a propagation path between a wireless terminal and a wireless base station (hereinafter referred to as "base station" for short) is blocked by a person, a large-sized object, or the like, a reception power along the propagation path is reduced significantly, and communication quality (for example, throughput or a packet error rate) is degraded significantly. When communication with the base station is interrupted due to the degradation in the communication quality, the wireless terminal searches for a separate base station (for example, a base station that uses the high frequency band described above or a low frequency band such as one for Long Term Evolution (LTE)), a connection to which is possible, but the time for which the communication with the wireless terminal is interrupted is lengthened.

As a protective measure against significant degradation in the communication quality described above, in some cases, in wireless communication that uses the high frequency band, an adaptive beamforming technology is used in which a radio wave propagation path, which is a wireless communication path that uses reflection from a neighboring building, a ceiling, or the like, is generated from moment to moment. For example, in PTL 1, in a wireless communication environment where a change in radio wave intensity occurs due to a movement of a person or an object, the wireless communication path is autonomously reestablished due to automatic adjustment of a wireless parameter, and thus a technology is known that provides a desired communication environment.

CITATION LIST

Patent Literature

PTL 1: JP-A-2010-147519

SUMMARY OF INVENTION

Technical Problem

The present disclosure, which is made in view of the situation described above in the related art, is to provide a wireless terminal and a base station switching method that perform quick switching to any other base station that possibly continues wireless communication even in a case where blocking occurs on a propagation path to a base station, allocate a base station, and suppress a reduction in a probability of connection to a cell where high-speed throughput is obtained.

Solution to Problem

According to an aspect of the present disclosure, there is provided a wireless terminal that is capable of performing communication with multiple base stations, the terminal including: an accumulation unit in which at least location information on the wireless terminal and information pertaining to the base station are accumulated, as a communication history, at the time of communication in the past with each of the base stations; an acquisition unit that acquires the location information on the wireless terminal; a derivation unit that derives at least a connection subject base station that is to be used for data communication and a connection standby base station that has the next highest priority for connection, which is second to the connection subject base station, from among the multiple base stations, based on the location information on the wireless terminal and the communication history that is accumulated in the accumulation unit; a communication unit that performs the data communication in a case where an attempt for connection to the connection subject base station succeeds; and a base station management unit that performs switching from the connection subject base station that is to be used for the data communication to the connection standby base station, in a case where communication with the connection subject base station is interrupted.

Furthermore, according to another aspect of the present disclosure, there is provided a base station switching method in a wireless terminal that is capable of performing communication with multiple base stations, the method including: a step of accumulating at least location information on the wireless terminal and information pertaining to the base station, as a communication history, in an accumulation unit at the time of communication in the past with each of the base stations; a step of acquiring the location information on the wireless terminal; a step of deriving at least a connection subject base station that is to be used for data communication and a connection standby base station that has the next highest priority for connection, which is second to the connection subject base station, from among the multiple base stations, based on the location information on the wireless terminal and the communication history that is accumulated in the accumulation unit; a step of performing the data communication in a case where an attempt for connection to the connection subject base station succeeds; and a step of performing switching from the connection subject base station that is to be used for the data communication to the connection standby base station, in a case where communication with the connection subject base station is interrupted.

Advantageous Effects of Invention

According to the present disclosure, even in a case where blocking occurs on a propagation path to a base station, quick switching to any other base station that possibly continues wireless communication can be performed, a base station can be allocated, and a reduction in a probability of connection to a cell where high-speed throughput is obtained can be suppressed.

BRIEF DESCRIPTION OF DRAWINGS

FIG. 4 is a schematic diagram illustrating an example of a total communication history table T1 that retains a communication history for every location of the wireless terminal.

FIG. 5 is a schematic diagram illustrating an example of a high-level communication history table T2 showing a correspondence relationship between high-level n distances di and a radio resource (a number of the base station).

FIG. 6 is a descriptive diagram illustrating an example of categorization of the base station that is managed by the wireless terminal according to the present embodiment.

DESCRIPTION OF EMBODIMENTS

Figure 1:
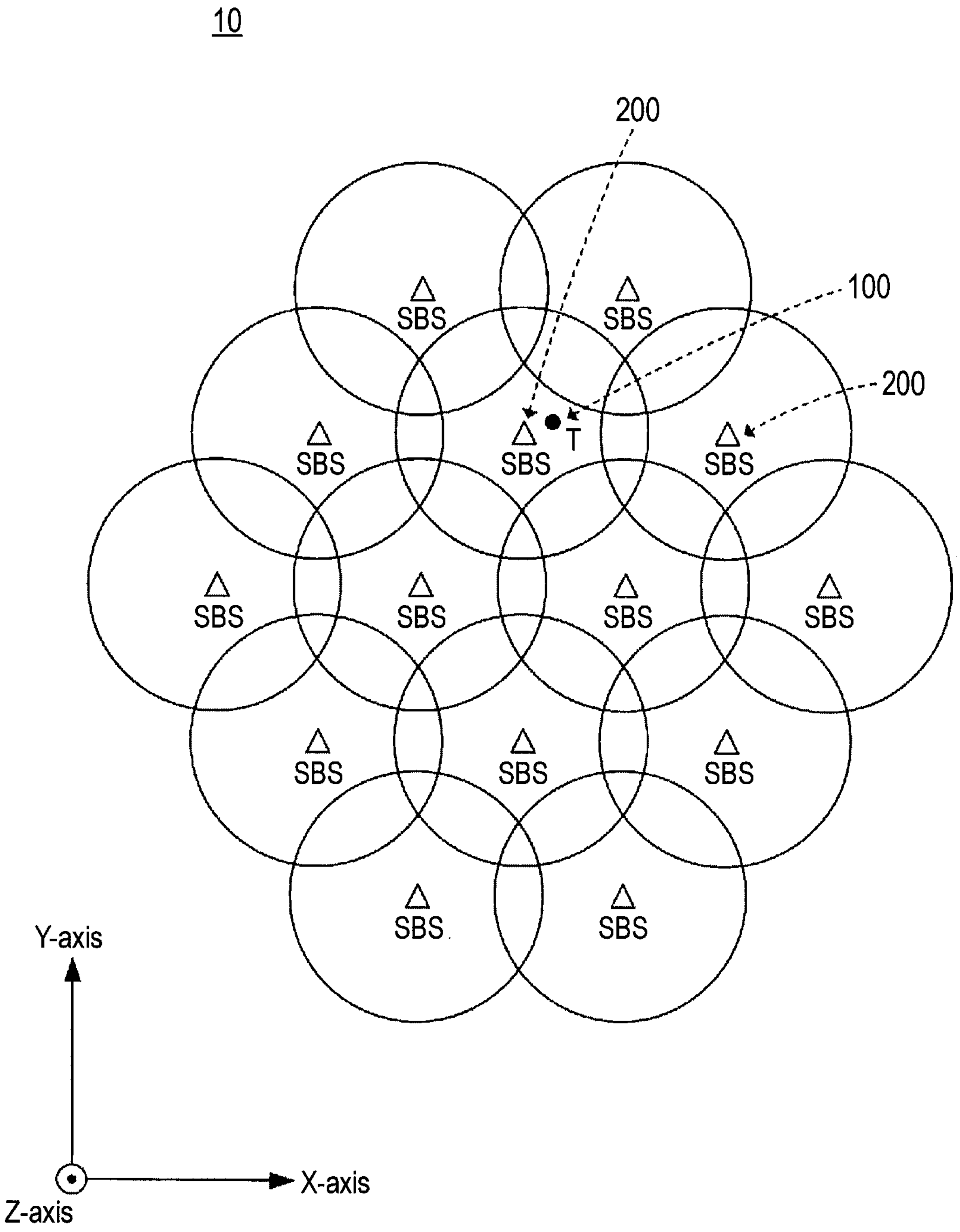
FIG. 1 is a schematic diagram illustrating a base station with which a wireless terminal according to the present embodiment possibly communicates, and an example of a small cell that is provided by the base station.

In a high frequency band (for example, a high Super High Frequency (SHF) band of 6 to 30 GHz) or an Extremely High Frequency (EHF) band of 30 to 300 GHz) (the same is hereinafter true) that is assumed to be allocated to the 5th generation mobile communication system (5G), when a propagation path between a wireless terminal and a wireless base station (hereinafter referred to "base station" for short) is blocked by a person, a large-sized object, or the like, a reception power along the propagation path is reduced significantly, and communication quality (for example, throughput or a packet error rate) is degraded significantly. When communication with the base station is interrupted due to the degradation in the communication quality, the wireless terminal searches for a separate base station (for example, a base station that uses the high frequency band described above or a low frequency band such as one for LTE), a connection to which is possible, but the time for which the communication with the wireless terminal is interrupted is lengthened. In order to avoid this, in a case where, for example, it is possible that the blocking of the propagation path between the wireless terminal between and the base station is predictable in advance, a scheme is proposed in which switching occurs from the base station to the wireless terminal is connected to a separate base station.

As a protective measure against significant degradation in the communication quality described above, in some cases, in wireless communication that uses the high frequency band, an adaptive beamforming technology is used in which a radio wave propagation path, which is a wireless communication path that uses reflection from a neighboring building, a ceiling, or the like, is generated from moment to moment.

However, in the adaptive beamforming in which the radio wave propagation path, which is the wireless communication path that uses the reflection from the neighboring building, or the ceiling, or the like, is generated from moment to moment, in some cases, in an environment where a reflection surface for a radio wave from a wireless station on the transmission side is difficult to obtain, the radio wave propagation path that is satisfactory in communication quality is not obtained.

Furthermore, in a case where the occurrence of the blocking of the propagation path between the wireless terminal and the base station is predictable in advance, in a scheme in which the switching from the base station to which the wireless terminal makes a connection to a separate base station occurs, there is a need to search for a base station from which a satisfactory connection is possibly expected, in addition to the base station to which wireless terminal is being connected. For this reason, the wireless terminal needs to perform an operation such as searching for a neighboring base station in communication, and power consumption by the wireless terminal increases due to such an operation.

Furthermore, in a case where the degradation in the communication quality (for example, a great decrease in throughput) occurs between the wireless terminal and a base station (which, in some cases, is hereinafter referred to "millimeter wave base station") that, for example, uses a frequency band for a millimeter wave, it is also considered that a connection is made to a base station that possibly provides a macro cell such as one for Long Term Evolution (LTE) (which, in some cases, is hereinafter referred to a "macro base station"), instead of a millimeter wave base station. However, in this scheme, even if any other millimeter wave base station is present in the vicinity, because the wireless terminal is connected to the macro base station, the wireless terminal loses an opportunity to make a connection to the millimeter wave base station, and a probability that high-speed throughput will be obtained within a cell that is possibly provided by the millimeter wave base station is decreased.

An object of the present disclosure is to allocate a base station by quickly performing switching to any other base station that possibly continues wireless communication even in a case where the blocking of the propagation path to the base station occurs, and thus to suppress a probability that a connection will be made to a cell where the high-speed throughput is obtained.

The wireless terminal and a base station switching method according to the present embodiment, which are specifically disclosed in the present disclosure, will be described in detail below suitably with reference to the drawings. However, in some cases, a description more detailed than is necessary is omitted. For example, in some cases, a detailed description of an already-known matter is omitted, or a description of substantially the same configuration is not repeated. The reason for this is to avoid unnecessary redundancy of the following description and to help a person of ordinary skill in the art to achieve easy understanding. It is noted that the accompanying drawings and the following description are provided in order for a person of ordinary skill in the art to get a sufficient understanding of the present disclosure, and therefore, this is not intended to impose a limitation on a subject matter that is recited in a claim.

FIG. 1 is a schematic diagram illustrating a base station 200 with which a wireless terminal 100 according to the present embodiment possibly communicates, and an example of a small cell that is provided by the base station 200. A wireless communication system 10 is configured to include at least one wireless terminal 100 and multiple base stations 200. The wireless terminal 100 and each of the base stations 200 are connected through a wireless communication line. It is noted that in FIG. 1, for brief description, only one wireless terminal 100 is illustrated, and that the horizontal direction with respect to the paper sheet where FIG. 1 is drawn is defined as the X-axis, the vertical direction with respect to the paper sheet is defined as the Y-axis, and the direction perpendicular to the X-axis and the Y-axis is defined as the Z-axis.

The wireless communication system 10 configures a network over which each of the base stations 200 that are communication partners to which the wireless terminal 100 makes a connection when performing wireless communication possibly performs wireless communication in compliance with the same wireless standard scheme. In a case where the wireless terminal 100 succeeds in making an attempt for communication (a trial for communication) with the base station 200, the wireless terminal 100 starts wireless communication with the base station 200. As a wireless communication scheme, a band of 28 GHz whose use in a high frequency band (for example, the 5th generation mobile station system (5G)) has been under study, or a millimeter wave (more precisely, a band of 30 GHz to 300 GHz) will be exemplarily described below. However, the base stations 200 that are illustrated in FIG. 1 may be base stations that correspond to multiple different wireless communication schemes (for example, Radio Access Technologies (RAT) or cell radius), respectively. The Radio Access Technology (RAT), for example, includes wireless communication standards, and pieces of information on wireless frequencies. Example of the wireless communication standard may include standards for Long Term Evolution (LTE), a Wireless Local Area Network (LAN), Digital Enhanced Cordless Telecommunication (DECT), the 3rd generation mobile communication system (3G), and the 4th generation mobile communication system (4G).

The network that is configured by the wireless communication system 10 may not be a C/U separation type network and may be the C/U separation type network. In the present embodiment, a network that is not a C/U separation type is exemplarily described. More precisely, the wireless communication system 10, communication of control data and communication of user data are performed by the same base station 200.

Each of the base stations 200 is a small cell base station that possibly provides the high-speed throughput that is based on the band of 28 GHz or the millimeter wave, which are described above, and the base stations 200 are arranged with high density. Furthermore, each of the base station 200, for example, is positioned in a factory, a construction site, a stadium, and a conference hall such as an international conference center. The wireless terminal 100 also communicates the control data and communicates the user data with any one of the small cell base stations. The control data includes data relating to Control (C)-Plane. The user data includes data relating to User (U)-Plane. Examples of the user data can include image data (for example, a moving image or a still image), and audio data, and can include a large amount of data.

The C-Plane is a communication protocol for communicating the control data for a call connection or radio resource allocation in wireless communication. The U-Plane is a communication protocol for actually performing communication (for example, video communication, voice communication, or data communication) between the wireless terminal 100 and the base station 200 using a radio resource that is allocated.

A cell radius of the base station (the small cell base station) 200, for example, is 10 m to 100 m, and is comparatively small compared with a macro cell. Radio Access Technologies (RAT) that are employable by the small cell base station are various and multiple types of them are present. It is noted that it is also considered that, for example, the cell radius may be equal to or greater than 100 m in a mountainous region, a desert region, and a wooded region, and is greater than that of a base station (not illustrated) that possibly provides the macro cell. More precisely, a distinction between a macro cell base station and the small cell base station does not depend on a magnitude of the cell radius.

In FIG. 1, "SBS" (Δ) denotes the small cell base station (the base station 200) and "T" (●) denotes the wireless terminal 100. A line that surrounds the small cell base station (the base station 200) denotes a range where the small cell base station possibly performs the communication. A range where each of the base stations 200 possibly performs the communication, for example, is determined according to a location of and the cell radius of the base station 200. Ranges where all base station 200 possibly perform the communication may have the same area and may have different areas.

The wireless terminal 100 and the base station 200 sets a Radio Access Technology (RAT) that is to be used for wireless communication, which is selected from among Radio Access Technologies (RATs) (for example, wireless communication standards or wireless frequencies) that are employable by each of them, and performs wireless communication using the Radio Access Technology (RAT) that is set. It is possible that each of the wireless terminal 100 and the base station 200 employs one or more Radio Access Technologies (RATs). Pieces of specific information on the Radio Access Technology (RAT), for example, include RAT 1 to RAT 5 that follow. RAT 1, for example, is for LTE in a frequency band of 700 MHz to 3 GHz. RAT 2, for example, is for LTE-Advanced in a frequency band of 15 GHz. RAT 3, for example, is for wireless LAN communication in a frequency band that is a band of 5 GHz. RAT 4, for example, is for a wireless communication scheme in a frequency band of 15 GHz and is for a 5th generation mobile communication scheme. RAT 5, for example, is for a wireless communication scheme (for example, a millimeter wave communication) in a frequency band that is a band of 60 GHz (for example, WiGig).

Figure 2:
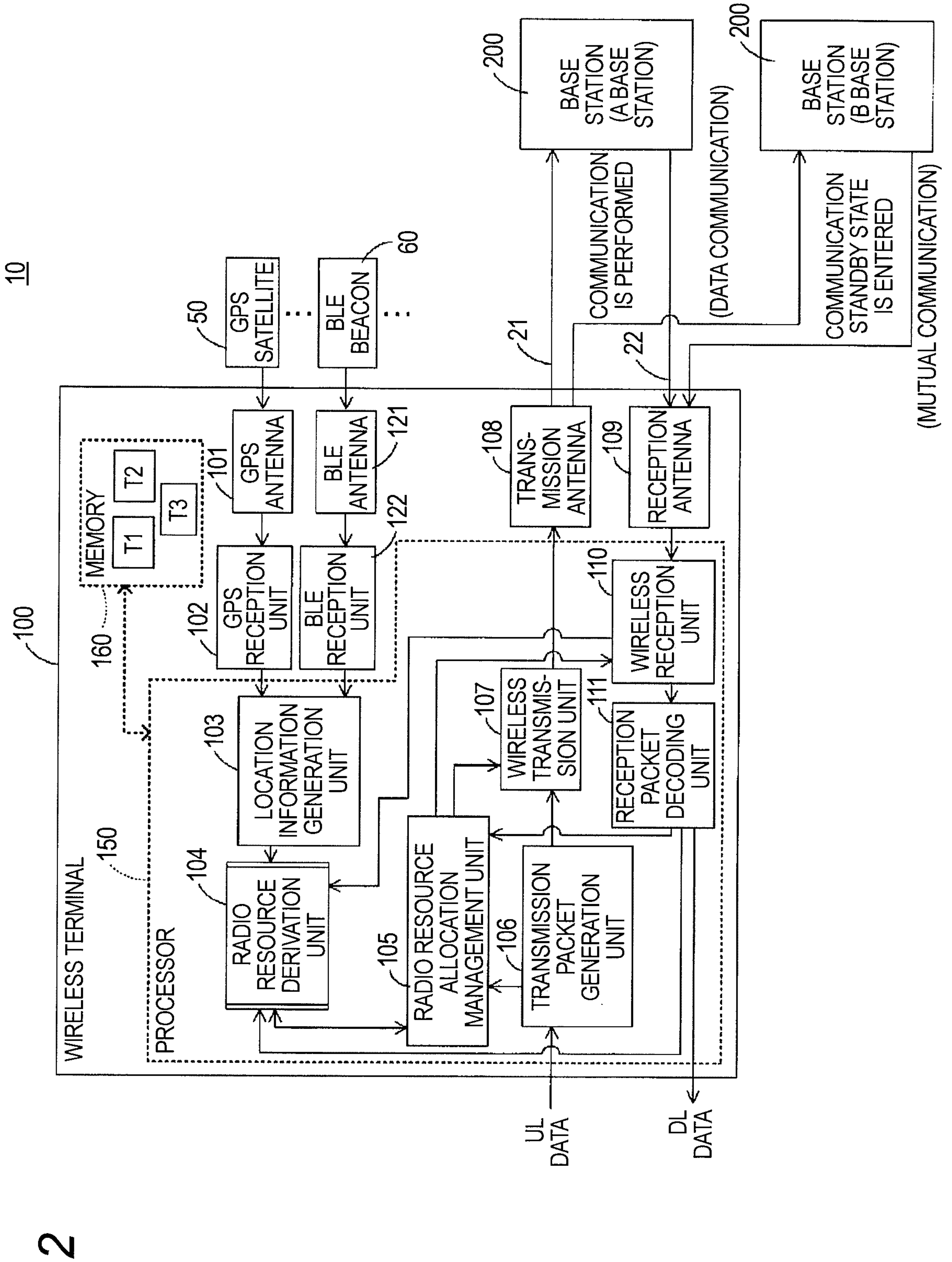
FIG. 2 is a block diagram illustrating in detail an example of an internal configuration of the wireless terminal according to the present embodiment.

FIG. 2 is a block diagram illustrating in detail an example of an internal configuration of the wireless terminal 100 according to the present embodiment. The wireless terminal 100 is configured to include a processor 150, a memory 160, a Global Positioning System (GPS) antenna 101, a GPS reception unit 102, a transmission antenna 108, a reception antenna 109, a Bluetooth (a registered trademark) Low Energy (BLE) antenna 121, and a BLE reception unit 122.

In cooperation with the memory 160, the processor 150 performs various processing operations or control operations. Specifically, referring to a program and data that are retained in the memory 160, the processor 150 executes the program, realizes a function of each of the following units. The units include a location information generation unit 103, a radio resource derivation unit 104, a radio resource allocation management unit 105, a transmission packet generation unit 106, a wireless transmission unit 107, a wireless reception unit 110, and a reception packet decoding unit 111.

The memory 160, for example, has a Random Access Memory (RAM) as a work memory that is used when the wireless terminal 100 performs processing, and a Read Only Memory (ROM) in which a program and data that define operation of the wireless terminal 100. Various pieces of data or information are temporarily stored in the RAM. A program that defines the operation (for example, processing (a step) that is performed as the base station switching method according to the present embodiment) of the wireless terminal 100 is written to the ROM.

Furthermore, a total communication history table T1, a high-level communication history table T2, and a base station type management table T3 are retained in the memory 160 as an accumulation unit. It is noted that in FIG. 2, the memory 160 is illustrated as being configured separately from the processor 150, but may be built into the processor 150. The memory 160 may include a primary storage device and a secondary storage device.

The GPS antenna 101 receives multiple signals, each of which indicates a time and a location (coordinates) of each of the GPS satellites 50, which are transmitted from each of the multiple (for example, three or four) GPS satellites 50, and outputs the received multiple signals to the GPS reception unit 102. Each of the GPS satellites 50 transmits a signal indicating the time and the location (the coordinates) of the GPS satellite 50.

The GPS reception unit 102 as an example of an acquisition unit calculates and acquires location information on the GPS reception unit 102 (more precisely, location information on the wireless terminal 100 itself) based on the multiple signals that are received by the GPS antenna 101. The location information that is obtained by this calculation, for example, indicates a current location of the wireless terminal 100 that is positioned outdoors, and is specifically information on a latitude, a longitude and an altitude. It is noted that the GPS reception unit 102 may be provided within the processor 150. The GPS reception unit 102 outputs the location information on the wireless terminal 100, which is obtained by the calculation, to the processor 150. It is noted that the calculation of the location information by the GPS reception unit 102 may be performed by the location information generation unit 103 of the processor 150 instead of the GPS reception unit 102. In this case, the information indicates the time and the location of each satellite GPS 50 that are included in the multiple signals that are received by the GPS antenna 101 is input into the location information generation unit 103 through the GPS reception unit 102.

At this point, in a case where the wireless terminal 100 is positioned outdoors, the reliability of the location information on the wireless terminal 100 that is calculated based on the signals from the multiple GPS satellites 50 is considerably high. However, in a case where the wireless terminal 100 is positioned indoors (for example, within a building or in an underground shopping center, but without any limitation to these areas) (the same is hereinafter true) or in the vicinity of a border between the outside and the inside of a building, in some cases, the location information on the wireless terminal 100 that is calculated based on the signals from the multiple GPS satellites 50 has a fixed error. In this manner, in a case where the wireless terminal 100 is positioned indoors or in the vicinity of a border between the outside and the inside of a building, the wireless terminal 100 calculates and acquires current location information on the wireless terminal 100 itself based on the multiple signals each of which indicates a time and a location (coordinates) of each of the BLE beacons 60, which are transmitted from each of the multiple BLE beacons 60 that are installed indoors. For example, in a case where it is determined that a Received Signal Strength Indicator (RSSI) of the signal from the BLE beacons 60 is greater than a prescribed threshold, the wireless terminal 100 determines that the wireless terminal 100 itself is positioned indoors or in the vicinity of a border between the outside and the inside of a building, and calculates the location information on the wireless terminal 100 itself based on the signals that are transmitted from the multiple BLE beacons 60. It is noted that a method of determining that the wireless terminal 100 is positioned indoors or in the vicinity of a border between the outside and the inside of a building is not limited to the method that is based on a result of comparison between the Received Signal Strength Indicator and the prescribed threshold, which are described above.

The BLE antenna 121 receives the multiple signals each of which indicates the time and the location (coordinates) of each BLE beacon 60 that are transmitted from each of the multiple (for example, two) BLE beacons 60, and outputs the received multiple signals to the BLE reception unit 122. Each of the BLE beacons 60 transmits the signal indicating the time and the location (the coordinates) of each BLE beacon 60. Furthermore, a distance between each of the BLE beacons 60 is already known. Each of the wireless terminal 100 may acquire, in advance, information on the distance between each of the BLE beacons 60, and may acquire such information from an external apparatus (not illustrated) (for example, any other wireless terminal or a distance information management server) directly or through a network (not illustrated).

The BLE reception unit 122 as an example of the acquisition unit calculates and acquires location information on the BLE reception unit 122 (more precisely, the location information on the wireless terminal 100 itself), for example, using a triangulation method, based on the multiple signals that are received by the BLE antenna 121. The information on the location that is obtained by this calculation indicates a current location of the wireless terminal 100 that is positioned indoors or in the vicinity of a border between the outside and the inside of a building.

It is noted the BLE reception unit 122 may calculate the location information on the wireless terminal 100 positioned indoors or in the vicinity of a border between the outside and the inside of a building using a combination of the multiple signals that are received by the BLE antenna 121, and a well-known method (for example, Pedestrian Dead Reckoning (PDR) or Pedestrian Map Matching (PMM)).

At this point, because installation information on each of the BLE beacons 60 is said to have information that consists of the latitude, the longitude, and the altitude, in the same manner as in a case where the wireless terminal 100 is positioned outdoors, although the wireless terminal 100 is positioned indoors or in the vicinity of a border between the outside and the inside of a building, a method of acquiring the location information in an outdoor environment can be applied extensively to an indoor environment. Because of this, the location information that is the same as the latitude, the longitude, and the altitude can be acquired. It is noted that the BLE reception unit 122 may be provided within the processor 150. The BLE reception unit 122 outputs the location information on the wireless terminal 100 that is obtained by the calculation, to the processor 150. It is noted that the calculation of the location information by the BLE reception unit 122 may be performed by the location information generation unit 103 of the processor 150 instead of the BLE reception unit 122. In this case, information indicating the time and the location of each BLE beacon 60, which are included in the multiple signals that are received by the BLE antenna 121, is input into the location information generation unit 103 through the BLE reception unit 122.

FIG. 4 is a schematic diagram illustrating an example of the total communication history table T1 that retains a communication history for every location of the wireless terminal 100. The total communication history table T1 retains pieces of information that are communication histories (communication records) that were accumulated whenever the wireless terminal 100 performed, in the past, wireless communication with any base station (hereinafter referred to "connection subject base station") of the multiple base stations 200. The connection subject base station is the base station 200 that is connected to the wireless terminal 100 for communication. The total communication history table T1 is retained in the memory 160 of each of the wireless terminals 100.

The communication history that is retained in the total communication history table T1, for example, has information indicating a sequential order (an order i) at the time of the wireless terminal 100's wireless communication with the connection subject base station, information indicating a location (latitude X, longitude Y, altitude Z) of the wireless terminal 100 at the time of the wireless communication, and information indicating an identification number m of the connection subject base station, in a manner that are associated with each other. For example, when a communication connection is made to the first connection subject base station, this means that the wireless terminal 100 is present at a location (X1, Y1, Z1) and that wireless communication with a connection base station with a number 3 is performed. A number of the connection subject base station is well-known in each of the wireless terminals 100, and for example, is retained in advance in the memory 160. In FIG. 4, as a result of the accumulation in the past, communication histories that correspond to the number of times that communication was performed, which is, for example, 100, are illustrated. It is noted that as a result of the accumulation in the past, no limitation is imposed to one hundred times and that, for example, communication histories that correspond to the number of times that communication was performed, which is, for example, 300, may be used.

It is noted that, although not illustrated in FIG. 4, the communication history may include the Radio Access Technology (RAT) (for example, a 5G millimeter wave) that is employed by the connection subject base station, the number of times of communication with the connection subject base station (the number of times of wireless connection), and information on an amount of communication (an amount of communication data) when performing communication with the connection subject base station.

In the present embodiment, histories of communication between the wireless terminal 100 and the connection subject base station are managed as the total communication history table T1 in the memory 160. Furthermore, when a trial communication connection to the connection subject base station that is derived by the radio resource derivation unit 104, succeeds, the communication history is updated by the radio resource allocation management unit 105 as an example of an update unit.

For example, in a case where the wireless terminal 100 is positioned outdoors, the location information generation unit 103 generates the location information on the wireless terminal 100 (more precisely, current location information on the wireless terminal 100) based on the information from the GPS reception unit 102, and outputs the generated location information to the radio resource derivation unit 104. For example, in a case where the wireless terminal 100 is positioned indoors or in the vicinity of a border between the outside and the inside of a building, the location information generation unit 103 generates the location information on the wireless terminal 100 (more precisely, current location information on the wireless terminal 100) based on the information from the BLE reception unit 122, and outputs the generated location information to the radio resource derivation unit 104.

The radio resource derivation unit 104 as an example of a derivation unit at least derives a connection subject base station (hereinafter also referred to as "A base station) as an example of a radio resource that is used for communication of data (for example, the control data or the user data) and a connection standby base station (hereinafter also referred to as "B base station") as an example of a radio resource that has the next highest priority for connection, which is second to the connection subject base station, from among multiple base stations 200, based on the location information on the wireless terminal 100 (more precisely, current location information on the wireless terminal 100), which is generated by the location information generation unit 103, and on the total communication history table T1 in the memory 160. Furthermore, the radio resource derivation unit 104 derives one or more connection standby candidate base stations (hereinafter also referred to "C base station") as examples of a radio resource that has the next highest priority for connection, which are second to the connection standby base station (the B base station), based on the current location information on the wireless terminal 100 and the total communication history table T1.

Specifically, for example, the radio resource derivation unit 104 derives various base stations (for example, the connection subject base station, the connection standby base station, and the connection standby candidate base station) in order of decreasing the number of times of allocation for wireless communication, from a prescribed number (n is a default value that is an integer which is equal to or greater than 2) of communication histories in which a distance di is short that is based on the current location information on the wireless terminal 100 and on the location information on the wireless terminal 100 in the communication history. Furthermore, when interruption of the communication with the connection subject base station (the A base station) is detected based on a communication interruption detection signal from the wireless reception unit 110, the radio resource derivation unit 104 derives the connection subject base station (the A base station) that is performing wireless communication before communication interruption occurs, as a blocking-occurring base station (hereinafter also referred to "D base station") as an example of a communication interruption base station. The radio resource derivation unit 104 outputs a result of the derivation, that is, the derived radio resource (for example, an identification number of the wireless base station), to the radio resource allocation management unit 105.

Figure 3:
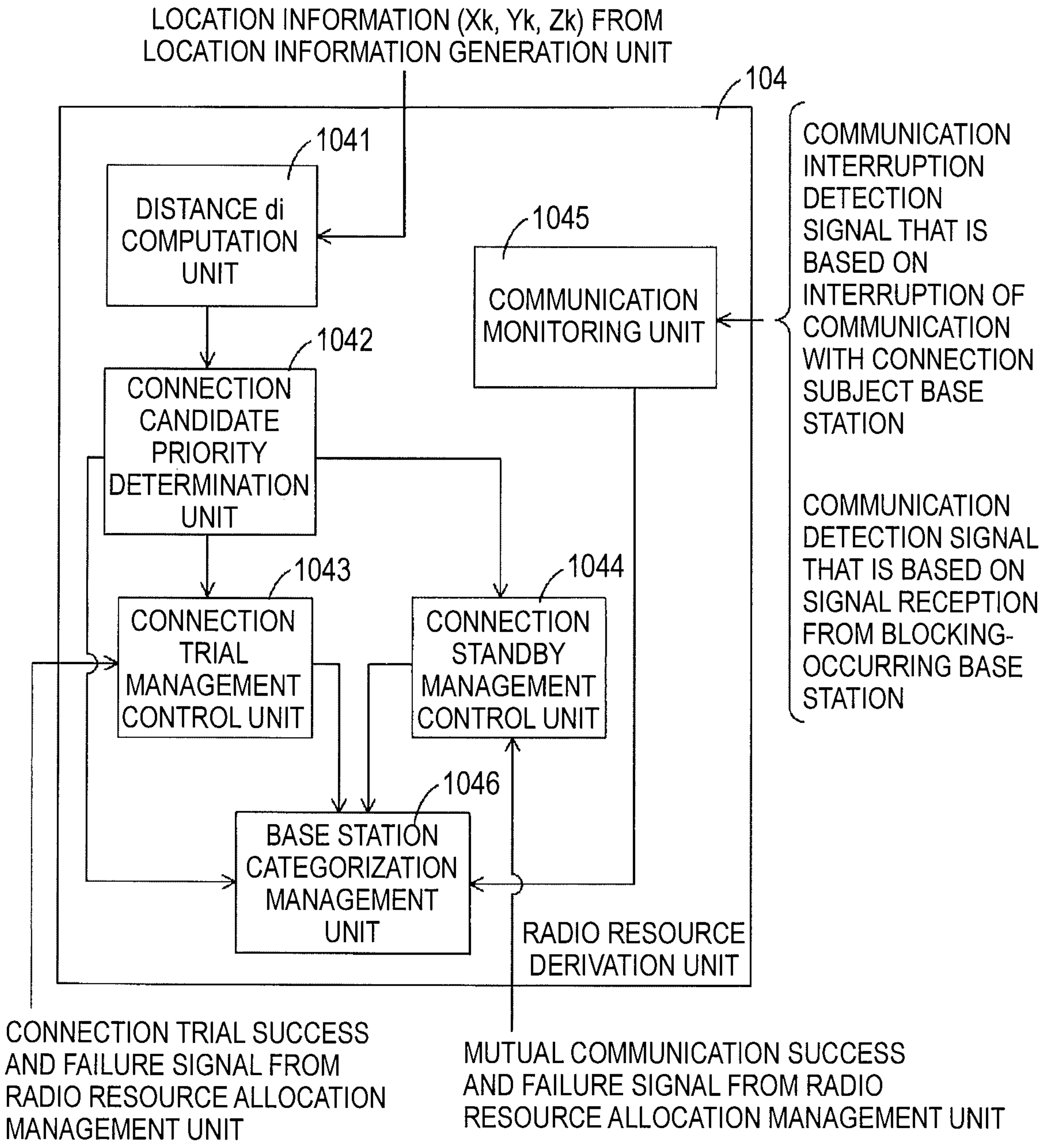
FIG. 3 is a block diagram illustrating in detail an example of an internal configuration of a radio resource derivation unit.

FIG. 3 is a block diagram illustrating in detail an example of an internal configuration of the radio resource derivation unit 104. The radio resource derivation unit 104 has a distance di computation unit 1041, a connection candidate priority determination unit 1042, a connection trial management control unit 1043, a connection standby management control unit 1044, a communication monitoring unit 1045, and a base station categorization management unit 1046.

Referring to the total communication history table T1 in FIG. 4, the distance di computation unit 1041 calculates the distance di that is based on a current location (Xk, Yk, Zk) of the wireless terminal 100 that is output from the location information generation unit 103, and on a location (Xi, Yi, Zi) of the wireless terminal 100 in the communication history, according to Equation (1). In Equation (1), i=1 to 100. It is noted that an example of calculating the distance di is not limited to a humming distance in Equation (1), and that the distance di may be an Euclid distance in Equation (2).

[Equation 1]

$$di=|Xk-Xi|+|Yk-Yi|+|Zk-Zi| \quad (1)$$

[Equation 2]

$$di=\sqrt{(Xk-Yk)^2+(Yk-Yi)^2+(Zk-Zi)^2} \quad (2)$$

It is noted that the distance di computation unit 1041 may multiply a specific factor (for example, the altitude) at a location (latitude, longitude, altitude) on the wireless terminal 100 by a weighting coefficient when calculating the distance di (refer to Equation (3)). In Equation (3), "10" that is a coefficient of |Zk−Zi| is only an example of the weighting coefficient. Although the latitudes or the longitudes in the location information on the wireless terminal 100 are the same, when the altitudes are different, in some cases, a communication environment is greatly different. In this case, by considering (specifically, multiplying) the weighting coefficient (for example, 10) described above for the altitude, the radio resource derivation unit 104 can derive the base station 200 (the connection subject base station (the A base station), the connection standby base station (the B base station), and the connection standby candidate base station (the C base station) in this order) that possibly provides a communication environment that corresponds to a current location of the wireless terminal 100.

[Equation (3)]

$$di=|Xk-Xi|+|Yk-Yi|+10|Zk-Zi| \quad (3)$$

The connection candidate priority determination unit 1042 extracts high-level 10 orders i (for example, in a case where n=10) and information indicating an identification number m of the base station 200 from each of the distances di that are calculated using Equation (1) and Equation (2), and thus generates the high-level communication history table T2 in FIG. 5.

FIG. 5 is a schematic diagram illustrating an example of the high-level communication history table T2 showing a correspondence relationship between high-level n distances di and a radio resource (a number of the base station). The high-level communication history table T2 is generated by the connection candidate priority determination unit 1042. The high-level communication history table T2 results from extracting a prescribed number n of high-level communication histories in which the distance di between the location information on the wireless terminal 100 when wireless communication with the connection subject base station was performed in the past, and current location information on the wireless terminal 100 is short, from among the communication histories in the total communication history table T1. The high-level communication history table T2 is retained in the memory 160 in each of the wireless terminal 100.

The communication history that is retained in the high-level communication history table T2, for example, has information indicating a sequential order (an order i) at the time of the wireless terminal 100's wireless communication with the connection subject base station, and information indicating the distance di between the location (latitude X, longitude Y, altitude Z) of the wireless terminal 100 when performing the wireless communication and current location (latitude X, longitude Y, altitude Z) of the wireless terminal 100, in a manner that is associated with the information indicating the identification number m of the connection subject base station. In FIG. 5, as a prescribed number n, "10" is illustrated as an example. More precisely, a distance di "0.13" is a minimum value (more precisely, a location that is closest to a current location of the wireless terminal 100 and at which the communication record in the past is present). A distance di "9.89" is a maximum value (more precisely, a location that is positioned farthest from a current location of the wireless terminal 100, among high-level 10 communication histories, and a record of past communication in which is present). For example, when the distance di is "0.13" that is the shortest, this means that the wireless terminal 100 performs wireless communication with the connection subject base station with a number 8. In the same manner, when the distance di is "9.89" that is the longest, this means that the wireless terminal 100 performs wireless communication with the connection subject base station with a number 3.

It is noted that the total communication history table T1 and the high-level communication history table T2 may be provided individually for an uplink 21 and a downlink 22 and may be provided for common use. Furthermore, the Radio Access Technology (RAT) that is employable by the base station 200, which is retained in the total communication history table T1 and the high-level communication history table T2, is the Radio Access Technology (RAT) that is also employable by the wireless terminal 100.

It is noted that the uplink 21 is a wireless line from the wireless terminal 100 toward the base station 200. The downlink 22 is a wireless line from the base station 200 toward the wireless terminal 100. The wireless lines broadly include various public lines, mobile telephone lines, wide area wireless lines, and the like.

The connection candidate priority determination unit 1042 derives (selects), for example, the connection subject base station (the A base station), the connection standby base station (the B base station), and the connection standby candidate base station (the C base station), as the base stations 200 that have a high priority for connection, in order of decreasing the number of times of allocation, among n (n is a default value that is an integer which is equal to or greater than 2) communication histories in which the distance di is short, in the high-level communication history table T2. The connection candidate priority determination unit 1042 outputs a result of the derivation (the selection) to the connection trial management control unit 1043, the connection standby management control unit 1044, and the base station categorization management unit 1046. An example of the derivation in the connection candidate priority determination unit 1042 will be described below.

It is noted that as in Equation (1) or Equation (2), the connection candidate priority determination unit 1042 calculates the distance di that has a three-dimensional element, but may calculate the distance di that has a two-dimensional element without considering a Z coordinate in Equation (1) or Equation (2). Accordingly, in a case where only the two-dimensional element is considered as the distance di (for example, when a request is made for a new communication connection at a location that has the same altitude as when all wireless communications were performed in the past), a load on the computation by the connection candidate priority determination unit 1042 when generating the high-level communication history table T2 is reduced.

It is noted that in the calculation of the distance di described above, the connection candidate priority determination unit 1042 generates the high-level communication history table T2 using all communication histories in the total communication history table T1, but may generate the high-level communication history table T2 using only a prescribed number (for example, 100 or 300) of communication histories in the total communication history table T1. Accordingly, the load on the computation by the connection candidate priority determination unit 1042 when generating the high-level communication history table T2 is reduced.

Furthermore, the connection candidate priority determination unit 1042 may generate the high-level communication history table T2 using a prescribed number of communication histories among communication histories in a time zone that is the same as a time zone at the time when a request is made to the wireless terminal 100 for a new communication connection. Accordingly, the connection candidate priority determination unit 1042 can generate the high-level communication history table T2 that has a communication history in accordance with a communication environment that varies with one time zone to another, for example, like in a daytime time zone or a nighttime time zone.

Furthermore, the connection candidate priority determination unit 1042 extracts the prescribed number n of communication histories from among communication histories in which the distance di is at or below a prescribed threshold dth (a default value), and thus may generate the high-level communication history table T2. Accordingly, it is possible that a communication history in which the distance di is greater than the prescribed threshold dth (in other words, a communication history in a case where there is a long distance between a location of the wireless terminal at the time of the wireless communication by the wireless terminal 100 in the past and a current location thereof) is excluded and that the high-level communication history table T2 is generated. Because of this, the wireless terminal 100 can perform allocation of a more suitable radio resource according to an environment of a network that is provided in the vicinity of a current location.

It is noted that the connection candidate priority determination unit 1042 is described as deriving various base stations 200 (the connection subject base station (the A base station), the connection standby base station (the B base station), the connection standby candidate base station (the C base station)), with a preference for the connection subject base station in the high-level communication history table T2, to which a radio resource (an identification number of the connection base station) is allocated many times, but that a derivation method is not limited to this. For example, in a case where an amount of communication data is included in the communication history in the high-level communication history table T2, the connection candidate priority determination unit 1042 derives various base station 200 described above in order of decreasing the amount of communication data (in other words, the number of transmission and reception data bytes). Accordingly, it is possible that the wireless terminal 100, for example, performs allocation with a preference for the base station 200 that possibly provides a small cell (in other words, a cell that has a high probability that an amount of communication data will be increased) where the high-speed throughput is obtained, as is the case with the 5th generation mobile communication system (5G) and or the millimeter wave, and an amount of suitable communication data is easy to perform.

The connection trial management control unit 1043 manages the attempt for communication (the trial for communication) with the wireless terminal 100 on the connection subject base station (the A base station) that is derived (selected) by the connection candidate priority determination unit 1042. For example, the connection trial management control unit 1043 instructs the radio resource allocation management unit 105 to make the attempt for communication (the trial for communication) with the connection subject base station (the A base station). The connection trial management control unit 1043 acquires a result (a connection trial success and failure signal) indicating whether or not the attempt for communication (the trial for communication) with the connection subject base station (the A base station) succeeds, from the radio resource allocation management unit 105, and outputs the acquired result to the base station categorization management unit 1046.

The connection standby management control unit 1044 manages performing of mutual communication of a control signal for maintaining a standby state of connection to the wireless terminal 100 on the connection standby base station (the B base station) that is derived (selected) by the connection candidate priority determination unit 1042. For example, the connection standby management control unit 1044 instructs the radio resource allocation management unit 105 to perform the mutual communication of the control signal (refer to the above description) with the connection standby base station (the B base station). The connection standby management control unit 1044 acquires a result (a mutual communication success and failure signal) indicating whether or not the mutual communication of the control signal with the connection standby base station (the B base station) succeeds, from the radio resource allocation management unit 105, and outputs the acquired result to the base station categorization management unit 1046.

The communication monitoring unit 1045 as an example of a monitoring unit monitors the occurrence or non-occurrence of interruption of communication with the connection subject base station (the A base station), while the communication with the connection subject base station (the A base station) is in progress. In a case where, for example, communication quality of a propagation path to the connection subject base station (the A base station) is degraded due to involvement of a blocking object such as a person or a vehicle and thus where the communication with the connection subject base station (the A base station) is interrupted, the communication monitoring unit 1045 acquires the communication interruption detection signal that is output from the wireless reception unit 110. The communication monitoring unit 1045 outputs the communication interruption detection signal (more precisely, the communication interruption detection signal that is based on the interruption of the communication with the connection subject base station (the A base station)), to the base station categorization management unit 1046.

Furthermore, in a case where a signal from the blocking-occurring base station (the D base station) can be received in the wireless reception unit 110 (for example, in a case where a blocking object such as a person or a vehicle is removed or is not present), the communication monitoring unit 1045 acquires a communication detection signal that is output from the wireless reception unit 110. The communication monitoring unit 1045 outputs the communication detection signal (more precisely, the communication detection signal that is based on the reception of the signal from the blocking-occurring base station (the D base station)), to the base station categorization management unit 1046.

Figure 7:
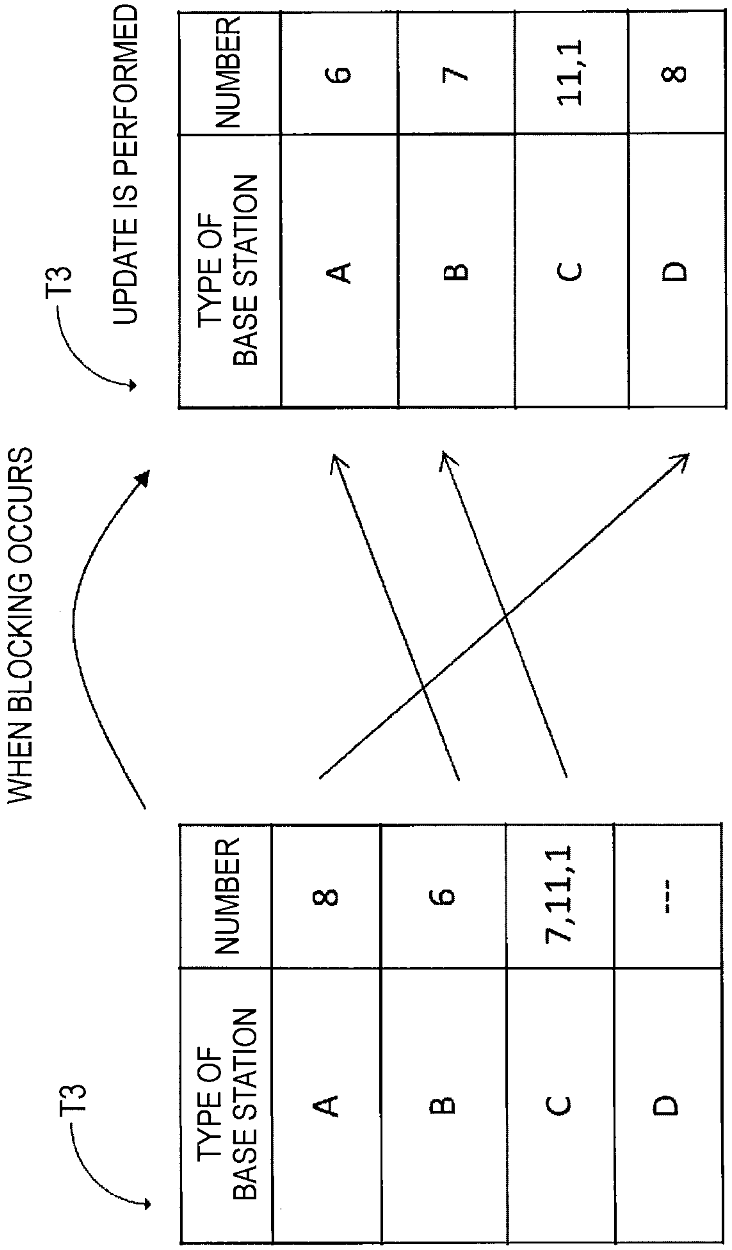
FIG. 7 is a descriptive diagram illustrating an example where a priority for connection, which is determined based on the high-level communication history table T2 that is illustrated in FIG. 6, is updated due to blocking.

The base station categorization management unit 1046 as an example of a base station management unit acquires a result of the derivation (the selection) of the base station 200, which is output from the connection candidate priority determination unit 1042, and, as illustrated in FIG. 6, performs categorization into the connection subject base station (the A base station), the connection standby base station (the B base station), and the connection standby candidate base station (the C base station) for management. The base station categorization management unit 1046 retains a result of the categorization, as the base station type management table T3 that is illustrated in FIG. 7, in the memory 160. Furthermore, based on the connection trial success and failure signal from the connection trial management control unit 1043 or the mutual communication success and failure signal from the connection standby management control unit 1044, and the communication interruption detection signal from the communication monitoring unit 1045, the base station categorization management unit 1046 updates the base station type management table T3 by switching to categorization into various base stations 200.

For example, when with the connection trial success and failure signal from the connection trial management control unit 1043, it is recognized that a connection trial succeeds, the base station categorization management unit 1046 categorizes the base station 200 that is a connection trial subject, as the connection subject base station (the A base station), and updates the base station type management table T3.

For example, when with the mutual communication success and failure signal the connection standby management control unit 1044, it is recognized that the mutual communication succeeds, the base station categorization management unit 1046 categorizes the base station 200 that is a mutual communication subject, as the connection standby base station (the B base station), and updates the base station type management table T3.

For example, when the communication interruption detection signal the communication monitoring unit 1045 is acquired, the base station categorization management unit 1046 categorizes the connection subject base station (the A base station) that is recognized as a base station which is currently performing communication, as the blocking-occurring base station (the D base station), and updates the base station type management table T3.

A type of base station 200 that is derived by the radio resource derivation unit 104 will be described here with reference to FIG. 6. FIG. 6 is a descriptive diagram illustrating an example of categorization of the base station 200 that is managed by the wireless terminal 100 according to the present embodiment.

As described above, in the present embodiment, the connection subject base station (the A base station), the connection standby base station (the B base station), the connection standby candidate base station (the C base station), and the blocking-occurring base station (the D base station) are derived by the radio resource derivation unit 104 from among multiple base stations 200. More precisely, the radio resource derivation unit 104 categorizes multiple base stations 200, which are the multiple base stations 200 described above, as the connection subject base station (the A base station), the connection standby base station (the B base station), the connection standby candidate base station (the C base station), and the blocking-occurring base station (the D base station) for management.

The connection subject base station (the A base station) is a base station 200 that has the highest priority for connection to the wireless terminal 100, and one connection subject base station is derived (selected) by the radio resource derivation unit 104. The abbreviation "A" means access.

The connection standby base station (the B base station) is a base station 200 that has the next highest priority for the connection to the wireless terminal 100, which is second to the connection subject base station (the A base station), and one connection standby base station is derived (selected) by the radio resource derivation unit 104. The abbreviation "B" means backup.

The connection standby candidate base station (the C base station) is a base station 200 that has the next highest priority for the connection to the wireless terminal 100, which is second to the connection standby base station (the B base station), and one or more connection standby candidate base stations are derived (selected) by the radio resource derivation unit 104. The abbreviation "C" means candidate.

The blocking-occurring base station (the D base station) is a base station 200 that has the lowest priority connection the wireless terminal 100, and, when the communication interruption occurs due to the degradation in the quality of the propagation path to the connection subject base station (the A base station), or the like (for example, in a case where a blocking object such as a person or a vehicle is present on the propagation path), is derived (selected) by the radio resource derivation unit 104. The abbreviated "D" means disconnect (interruption).

The radio resource allocation management unit 105 acquires a result of deriving the radio resource that is output from the radio resource derivation unit 104. In addition to identification numbers of the connection subject base station (the A base station), the connection standby base station (the B base station), the connection standby candidate base station (the C base station), and the blocking-occurring base station (the D base station) as radio resources that are derived by the radio resource derivation unit 104, for example, information indicating which wireless communication standard is used between each of the base station 200 and the wireless terminal 100, or information pertaining to a frequency bandwidth may be included in this result of deriving the radio resource.

The radio resource allocation management unit 105 allocates a radio resource that is to be used for wireless communication with the connection subject base station (the A base station) or the connection standby base station (the B base station) for management. This radio resource, for example, includes a wireless frequency that is to be used for wireless communication, and a Resource Block (RB) of the wireless frequency. The resource block, for example, refers to a unit of allocation of wireless frequency, which results from division into a frequency axis and a time axis (for example, a time slot) of the wireless frequency (for example, a subcarrier frequency).

The radio resource allocation management unit 105 inquires of the connection subject base station (the A base station) or the connection standby base station (the B base station) whether or not a resource block that is a candidate wireless frequency for allocation is allocable. Based on the candidate wireless frequency for allocation, the connection subject base station (the A base station) or the connection standby base station (the B base station) searches for an allocation situation of the resource block of the wireless frequency, determines whether or not the resource block is allocable, and transmits a result of the determination to the wireless terminal 100. Referring to this result of the determination, the radio resource allocation management unit 105 determines whether or not the resource block of the wireless frequency, which is an allocation candidate, is allocable. The result of the determination, for example, includes information on whether or not the resource block is allocable, or information on the resource block of the wireless frequency that is to be allocated in a case where the resource block is allocable.

Based on the result of the determination described above, the radio resource allocation management unit 105 allocates the resource block that is not allocated, of the wireless frequency, which is to be used for communication with the connection subject base station (the A base station) or the connection standby base station (the B base station). The radio resource allocation management unit 105 may allocate the resource block and may designate Adaptive Modulation and Coding (AMC).

It is noted that in a case where the allocation of the wireless frequency that is the allocation candidate is impossible, the radio resource allocation management unit 105 performs changing from the wireless frequency to a wireless frequency that has the next highest sequential order, and selects a new wireless frequency from among wireless frequencies that are allocation candidates which have the next highest sequential order. Furthermore, in a case where a wireless frequency of which a resource block is allocable to the connection subject base station (the A base station) or the connection standby base station (the B base station) is not present, the radio resource allocation management unit 105 may output a message that a change from the base station which has to perform wireless communication to a base station that has the next highest priority for connection takes place, to the radio resource derivation unit 104. When acquiring this message, the radio resource derivation unit 104 may select a new the connection subject base station (the A base station) or a new connection standby base station (the B base station) from among one or more connection standby candidate base stations (the C base stations).

Furthermore, the radio resource allocation management unit 105 acquires information on a usage history of a radio resource, from the transmission packet generation unit 106 or the reception packet decoding unit 111. This information on the usage history, for example, includes information on the connection subject base station (the A base station) that wirelessly communicated with the wireless terminal 100, information on a wireless frequency that was used for the communication with the connection subject base station (the A base station), and information on an amount of communication that was communicated using the wireless frequency. The radio resource allocation management unit 105 as an example of the update unit, for example, may add the amount of communication that is included in the information on the usage history, to the wireless frequency in the total communication history table T1, which is the same as the wireless frequency that is included in the information on the acquired usage history, and may update the total communication history table T1.

The radio resource allocation management unit 105 sends information on the allocated radio resource, more precisely, information on the wireless frequency and the resource block that are to be used for communication with the connection subject base station, to the wireless transmission unit 107 or the wireless reception unit 110. In this case, the radio resource allocation management unit 105 sends information on the allocated radio resource for the uplink 21 to the wireless transmission unit 107. Furthermore, the radio resource allocation management unit 105 sends information on the allocated radio resource for the downlink 22 to the wireless reception unit 110.

The transmission packet generation unit 106 generates a packet (a transmission packet) that is to be transmitted to the base station 200, using uplink data (UL data) that is input. The transmission packet includes data for the uplink 21. The data for the uplink 21 (for example, the control data or the user data), for example, is obtained from the memory 160, an external device (not illustrated) such as a storage device, and a processing unit for various pieces of software (not illustrated).

The transmission packet generation unit 106 sends information on a usage history of a radio resource relating to the communication of the transmission packet, to the radio resource allocation management unit 105.

The wireless transmission unit 107 as an example of a communication unit transmits a transmission packet (for example, user data) that is generated by the transmission packet generation unit 106 to the connection subject base station (the A base station) that is referred to by the radio resource allocation management unit 105, through the transmission antenna 108 and the uplink 21, using a radio resource that is allocated by the radio resource allocation management unit 105. Furthermore, the wireless transmission unit 107 transmits a transmission packet (for example, a control signal for maintaining the standby state of connection) that is generated by the transmission packet generation unit 106, to the connection standby base station (the B base station) that is referred to by the radio resource allocation management unit 105, through the transmission antenna 108 and the uplink 21, using a radio resource that is allocated by the radio resource allocation management unit 105.

The wireless reception unit 110 as an example of the communication unit receives the packet (for example, the user data) from the connection subject base station (the A base station), through the downlink 22 and the reception antenna 109, using a radio resource that is allocated by the radio resource allocation management unit 105. Furthermore, the wireless reception unit 110 receives the packet (for example, the control signal for maintaining the standby state of connection) from the connection standby base station (the B base station), through the downlink 22 and the reception antenna 109, using a radio resource that is allocated by the radio resource allocation management unit 105.

The reception packet decoding unit 111 decodes the packet that is received by the wireless reception unit 110 and thus obtains decoding data. The decoding data includes the data for the downlink 22. The data (for example, the control data or the user data) for the downlink 22, for example, is handed to the memory 160, an external device (not illustrated) such as a storage device or a display device, or a processing unit (not illustrated) for various pieces of software.

Furthermore, in some cases, the data for the downlink 22 includes information on a connection candidate base station that is selected using a well-known method. The information on the connection candidate base station is sent to the radio resource allocation management unit 105.

Furthermore, in some cases, the data for the downlink 22 includes control information pertaining to allocation of a radio resource. This control information is sent to the radio resource allocation management unit 105. The control information includes a result of determination of whether or not a resource block is allocable by the connection base station.

Furthermore, the reception packet decoding unit 111 sends information on a usage history on the radio resource relating to the communication of the reception packet, to the radio resource allocation management unit 105.

Next, an example where the radio resource derivation unit 104 derives the connection subject base station (the A base station), the connection standby base station (the B base station), and the connection standby candidate base station (the C base station) will be specifically described with reference to FIGS. 4, 5, and 7. FIG. 7 is a descriptive diagram illustrating an example where the priority for connection, which is determined based on the high-level communication history table T2 that is illustrated in FIG. 6, is updated due to blocking. In FIG. 4, it is assumed that communication histories which correspond to the number of times that communication was performed in the past, which is 100, are retained in the total communication history table T1, and that a request to the wireless terminal 100 for the 101-st communication connection is made at a location (Xk, Yk, Zk).

Referring to the total communication history table T1 in FIG. 4, the radio resource derivation unit 104 calculates the distance di that is based on a current location (Xk, Yk, Zk) of the wireless terminal 100 and a location (Xi, Yi, Zi) of the wireless terminal 100 in the communication history, according to Equation (1), Equation (2), or Equation (3).

The radio resource derivation unit 104 extracts high-level 10 orders i (for example, in a case where n=10) and information indicating the identification number m of the base station 200 from each of the distances di that are calculated using Equation (1), Equation (2), or Equation (3), and thus generates the high-level communication history table T2 in FIG. 5. With the high-level communication history table T2 in FIG. 5, it is possibly determined that, as radio resources (for example, identification numbers of the connection base stations), radio resource (8) is used (allocated) three times, radio resource (6) three times, radio resource (7) two times, radio resource (11) one time, and radio resource (1) one time.

Thus, in response to a request for the 101-st new communication connection, the radio resource derivation unit 104 determines (derives) that, as the sequential order of connection priorities of radio resources that have to be allocated, radio resource (8) is followed by radio resource (6), then by radio resource (7), then by radio resource (11), and then by radio resource (1), in order of increasing the distance di and decreasing the number of times of allocation. In other words, the radio resource derivation unit 104 derives (selects) the base station 200 with radio resource (8) as the connection subject base station (the A base station), the base station 200 with the radio resource (6) as the connection standby base station (the B base station), the base station 200 with radio resource (7) as the connection standby candidate base station (the C base station), the base station 200 with radio resource (11) as the connection standby candidate base station (the C base station), and the base station 200 with radio resource (1) as the connection standby candidate base station (the C base station) (refer to FIG. 7).

In the base station type management table T3 that is illustrated in FIG. 7, as types of base stations, the connection subject base station (the A base station), the connection standby base station (the B base station), the connection standby candidate base station (the C base station), and the blocking-occurring base station (the D base station), and identification numbers that correspond to the base stations 200, respectively, are illustrated. The base station type management table T3 that is illustrated on the left side of the paper sheet on which FIG. 7 is drawn, for example, shows a state that is attained before a blocking object is involved in a propagation path between the wireless terminal 100 and the base station 200 (more precisely, the connection subject base station (the A base station)) with radio resource (8). Therefore, the wireless terminal 100 first attempts (tries) to make a connection to the base station 200 with radio resource (8), and, in a case where a connection trial succeeds, performs the mutual communication of a control signal for maintaining the standby state of connection to the base station 200 with radio resource (6) with the base station 200 with radio resource (6) as the connection standby base station (the B base station). Furthermore, the wireless terminal 100 set the base station 200 with each of radio resource (7), radio resource (11), and radio resource (1) to be the connection standby candidate base station (the C base station). It is noted that in a case where an attempt to make a connection to the base station 200 with radio resource (8) fails, the wireless terminal 100 makes an attempt to make a connection to the base station 200 with radio resource (6). In a case where this attempt to make a connection succeeds, the wireless terminal 100 sets a base station with radio resource (6) to be the connection subject base station (the A base station).

Furthermore, the base station type management table T3 that is illustrated on the right side of the paper sheet on which FIG. 7 is drawn, for example, shows a state that is attained after a blocking object is involved in a propagation path between the wireless terminal 100 and the base station 200 (more precisely, the connection subject base station (the A base station)) with radio resource (8). Therefore, the wireless terminal 100 sets the base station 200 with radio resource (6) that has the next highest priority for connection, which is second to radio resource (8) in such a manner as to be graded up to a new connection subject base station (the A base station), and sets the base station 200 with radio resource (7) that has the next highest priority for connection, which is second to radio resource (6) in such a manner as to be graded up to a new connection standby base station (the B base station). Moreover, the wireless terminal 100 sets the base station 200 (more precisely, the base station 200 that was the connection subject base station (the A base station) until communication interruption occurs), communication with which is interrupted due to the involvement of the blocking object, in such a manner as to be graded down to the blocking-occurring base station (the D base station).

The sequential order of the connection priorities of the radio resources that have to be allocated is determined in this manner, but, for a current wireless terminal 100, it is also assumed that the base station 200 with radio resource (8) is not necessarily a base station 200 with a best radio resource. This is because for example, in some cases, radio resource (8) is occupied by other multiple wireless terminals. Importantly, by the radio resource derivation unit 104, a range of priorities of the connection to the base station 200 as the radio resource that has to be allocated can be narrowed down and categorization into the connection subject base station (the A base station), the connection standby base station (the B base station), the connection standby candidate base station (the C base station), and the blocking-occurring base station (the D base station) can be performed.

At this point, the following order: radio resource (8), radio resource (6) and the following order: radio resource (11), radio resource (1) each correspond to order of increasing the distance di. Accordingly, it is possible that the radio resource derivation unit 104 allocates a base station in order of decreasing the number of records of wireless communication with the wireless terminal 100 in the past, and the data communication can be easily performed in a suitable manner under a more stable communication environment in a current location of the wireless terminal 100.

Next, an operation procedure when a new communication connection request occurs to the wireless terminal 100 in the wireless communication system 10 according to the present embodiment will be described with reference to FIGS. 8 and 9.

Figure 8:
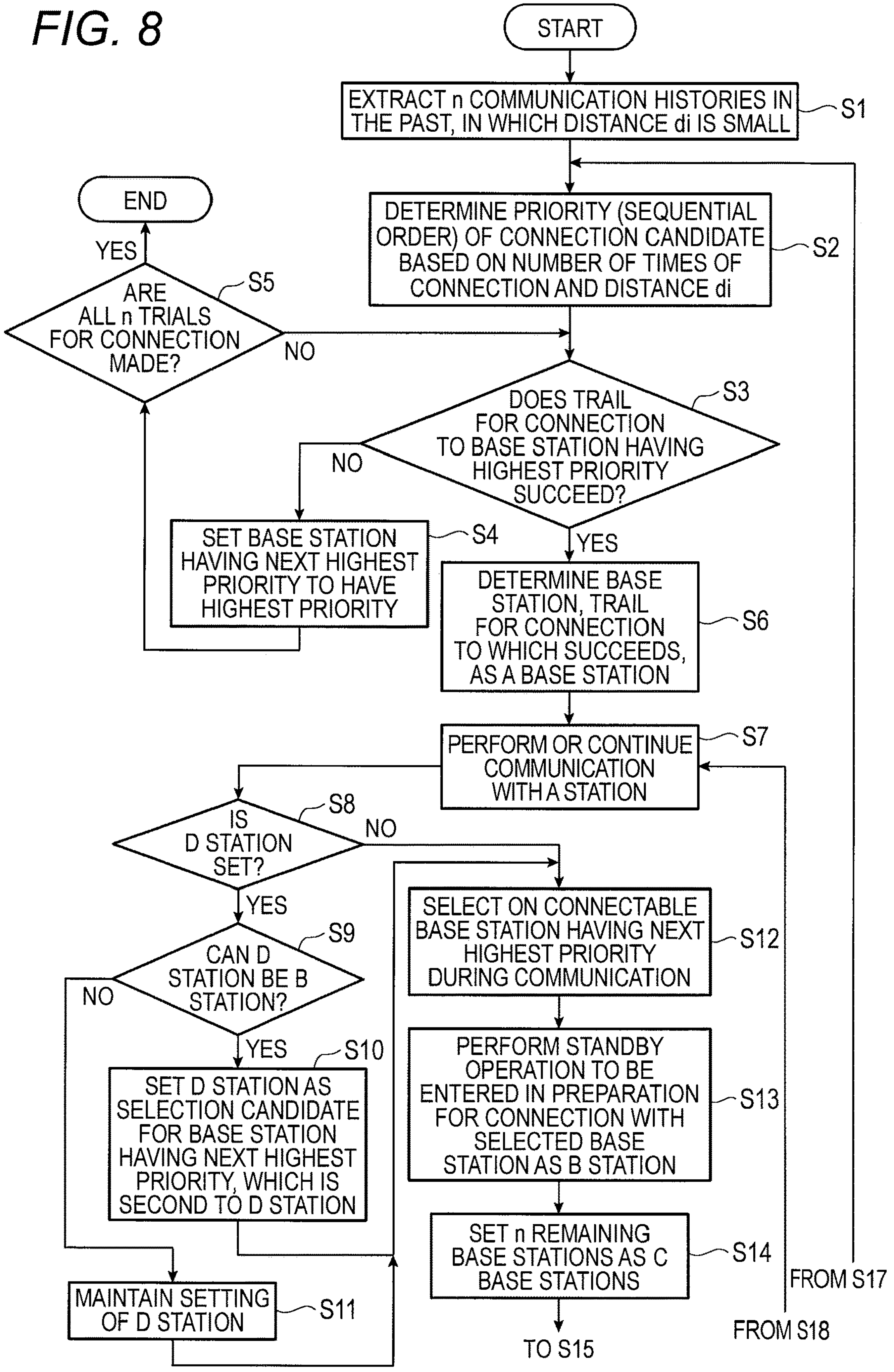
FIG. 8 is a flowchart for describing in detail an example of an operation procedure in a case where a communication connection request occurs to the wireless terminal according to the present embodiment.
Figure 9:
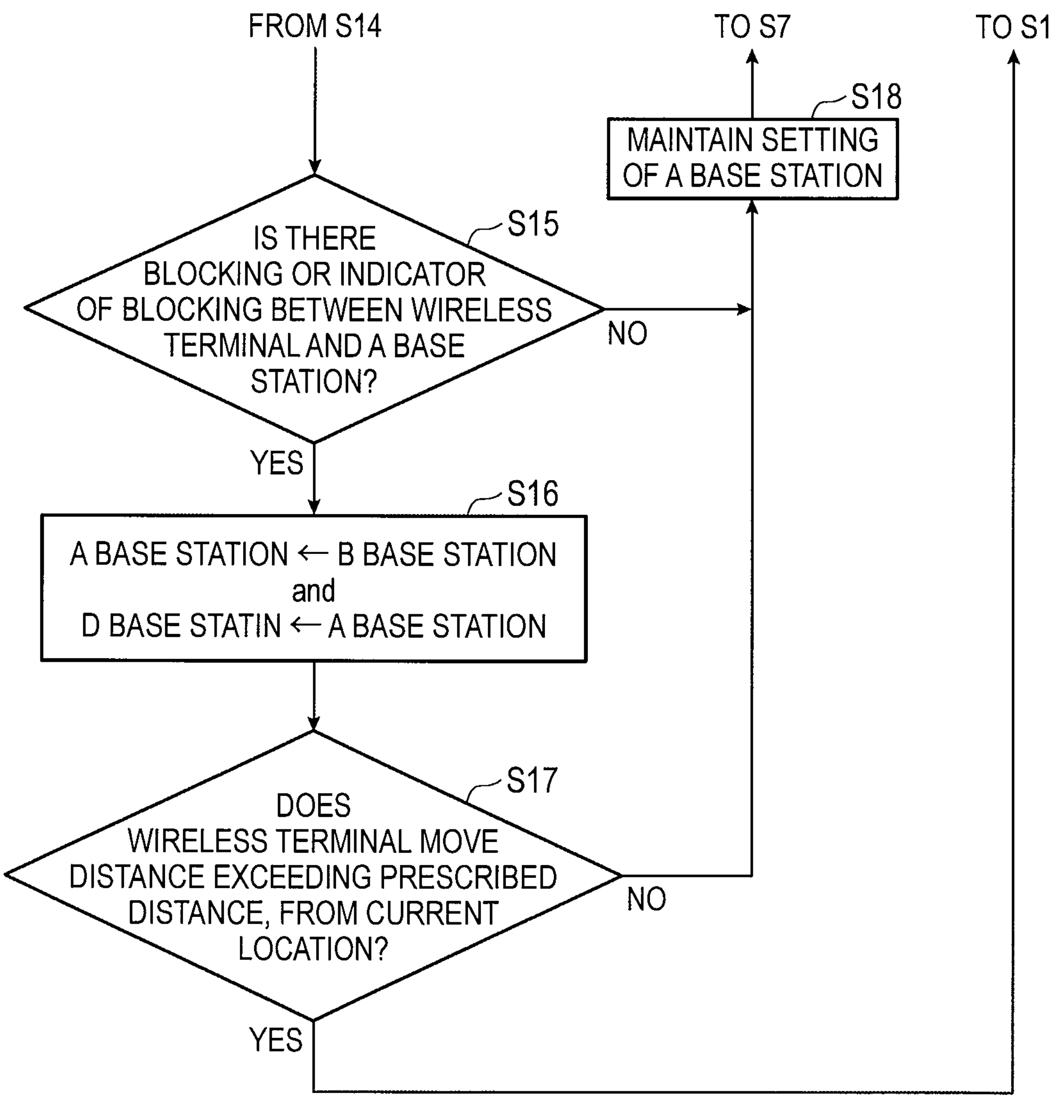
FIG. 9 is a flowchart for describing in detail an example of an operation procedure in a case where a communication connection request occurs to the wireless terminal according to the present embodiment.

FIGS. 8 and 9 are flowcharts for describing in detail an example of the operation procedure in a case where a communication connection request occurs to the wireless terminal 100 according to the present embodiment. For brief description, a case where the wireless terminal 100 is positioned indoors is exemplarily described with reference to FIGS. 8 and 9, and in the same manner, this description also applies in a case where the wireless terminal 100 is positioned indoors or in the vicinity of a border between the outside and the inside of a building.

In FIG. 8, the wireless reception unit 110 or the wireless transmission unit 107 of the wireless terminal 100 determines whether or not a new connection request occurs. This connection request, for example, may be any one of a connection request from the wireless terminal 100 to the base station 200 and a connection request from the base station 200 to the wireless terminal 100. For example, in a case where the wireless terminal 100 acquires and reproduces moving image data on a content server (not illustrated), the connection request from the wireless terminal 100 to the base station 200 occurs. For example, in a case where a telephone call is made from any other wireless terminal to the wireless terminal 100, a connection request from any one base station 200 to the wireless terminal 100 occurs.

Based on multiple signals that are received by the GPS antenna 101, the GPS reception unit 102 calculates and acquires the location information (more precisely, the location information on the wireless terminal 100 itself) on the GPS reception unit 102. The GPS reception unit 102 outputs the location information on the wireless terminal 100, which is obtained by the calculation, to the processor 150. For example, in the case where the wireless terminal 100 is positioned outdoors, the location information generation unit 103 generates the location information on the wireless terminal 100 (more precisely, current location information on the wireless terminal 100) based on the information from the GPS reception unit 102, and outputs the generated location information to the radio resource derivation unit 104.

Referring to the total communication history table T1 in the memory 160, the distance di computation unit 1041 of the radio resource derivation unit 104 calculates the distance di that is based on the current location information on the wireless terminal 100 and the location information on the wireless terminal 100 in the communication history, according to any one (for example, Equation (1)) of Equation (1) to Equation (3) (S1). Setting as to which Equation is used is performed in advance in each of the wireless terminals 100. The connection candidate priority determination unit 1042 of the radio resource derivation unit 104 extracts and acquires a prescribed number (n is a default value that is an integer which is equal to or greater than 2) of communication histories in which the distance di that is based on current location information on the wireless terminal 100 and on the location information on the wireless terminal 100 in the communication history is short (S1). A result of the extraction in Step S1, for example, is the high-level communication history table T2 that is illustrated in FIG. 5.

The connection candidate priority determination unit 1042 of the radio resource derivation unit 104 knows (recognizes) the radio resource (for example, the identification number of the base station 200, or the number of times of connection) that is included in all n high-level communication histories that are extracted in Step S1. Based on the distance di or the radio resource, the connection candidate priority determination unit 1042 of the radio resource derivation unit 104 derives (determines) the connection subject base station (the A base station) that is used communication of data (for example, the control data or the user data), the connection standby base station (the B base station) that has the next highest priority for connection, which is second to the connection subject base station, and one or more connection standby candidate base stations (the C base stations) that have the next highest priority for connection, which are second to the connection standby base station (the B base station), from among multiple base stations 200 (S2).

The connection trial management control unit 1043 of the radio resource derivation unit 104 instructs the radio resource allocation management unit 105 to make the attempt for communication (the trial for communication) with the connection subject base station (the A base station) that is derived in Step S2.

the radio resource allocation management unit 105 allocates a radio resource (the identification number of the base station 200) that has the highest priority, to the wireless transmission unit 107 and the wireless reception unit 110, among priorities for connection, which are determined in Step S2, and tries to make a communication connection to the connection subject base station (the A base station) (S3). For example, the transmission packet generation unit 106 generates the transmission packet that includes the data for the uplink 21. The wireless transmission unit 107 transmits the transmission packet to the connection subject base station (the A base station) that is determined. Furthermore, for example, the wireless reception unit 110 receives the reception packet from the connection subject base station (the A base station) that is determined. The reception packet decoding unit 111 decodes the reception packet and obtains the data for the downlink 22.

More precisely, the wireless terminal 100 inquires of the communication connection the base station 200 (more precisely, the connection subject base station (the A base station)), which tries to make a communication connection, whether or not the resource block of the wireless frequency is allocable for the wireless communication with the wireless terminal 100. In response to the inquiry from the wireless terminal 100, in a case where it is determined that the resource block of the wireless frequency is allocable, the connection subject base station (the A base station) transmits a message that the communication connection succeeds, to the wireless terminal 100. The connection trial management control unit 1043 acquires a result (the connection trial success and failure signal) indicating whether the attempt for communication (the trial for communication) with the connection subject base station (the A base station) succeeds or fails, from the radio resource allocation management unit 105.

In a case where the attempt for connection (the trial for connection) to the base station 200 (more precisely, the connection subject base station (the A base station)) that has the highest priority fails (NO in S3), the base station categorization management unit 1046 of the radio resource derivation unit 104 sets the base station 200 (more precisely, the base station 200 that is derived as the connection standby base station (the B base station)) that has the next highest priority for connection, to be the base station 200 (more precisely, the connection subject base station (the A base station)) that has the highest priority (S4). Subsequent to Step S4, in a case where all n trials for connection, which are extracted in Step S1, are made (YES in S5), the wireless terminal 100 that is illustrated in FIG. 8 ends its operation without making a connection to any one of the base station 200.

It is noted that in a case where all n connection trials, which are extracted in Step S1, are made (YES in S5), the radio resource derivation unit 104 may conduct a search (a cell search) of a candidate base station (for example, a base station other than the base station for the 5G or the millimeter wave) available for communication connection in the vicinity of the radio resource derivation unit 104 itself (the wireless terminal 100), using a well-known method. In this case, based on a result of the search for the base station 200 that is present in the vicinity of the wireless terminal 100, the radio resource derivation unit 104 determines a base station that can be the connection candidate.

In this well-known method, for example, the radio resource derivation unit 104 sequentially searches for base stations that use RAT 1 to RAT 5, and the wireless transmission unit 107 notifies a prescribed base station of a result of the search. According to the notified result of the search, the prescribed base station selects a base station that can be the connection candidate and transmits information on the base station to the wireless terminal 100. The radio resource derivation unit 104 acquires the information on the base station that can be the connection candidate, from the reception packet that is received by the wireless reception unit 110 and is decoded by the reception packet decoding unit 111, and makes a determination as the base station that is the connection candidate.

It is noted that as the well-known method, a method is exemplarily described in which the result of the cell search is notified to a prescribed base station and the prescribed base station transfers the information on the base station that can be the connection candidate, to the wireless terminal 100. Instead of this, the wireless terminal 100 itself may determine the base station that can be the connection candidate, based on the result of the cell search, without the result of the cell search being notified to the prescribed base station.

On the other hand, in a case where all n connection trials, which are extracted in Step S1, is not made (NO in S5), the connection trial management control unit 1043 of the radio resource derivation unit 104 instructs the radio resource allocation management unit 105 to make the attempt for communication (the trial for communication) with a new connection subject base station (the A base station) that is set in Step S4. The connection trial management control unit 1043 acquires the result (the connection trial success and failure signal) indicating whether the attempt for communication (the trial for communication) with the connection subject base station (the A base station) succeeds or fails, from the radio resource allocation management unit 105.

In a case where the attempt for the connection (the trial for the connection) with the base station 200 (more precisely, the connection subject base station (the A base station)) that has the highest priority succeeds (YES in S3), the base station categorization management unit 1046 of the radio resource derivation unit 104 categories the base station 200 that is the connection trial subject, as the connection subject base station (the A base station), and thus updates the base station type management table T3 (S6). Accordingly, the wireless terminal 100 can perform transmission or reception (communication) of data (for example, the control data or the user data (for example, video data)) to or from the connection subject base station (the A base station), or, in a case where the communication is already being performed, can continue the communication (S7). Moreover, the radio resource allocation management unit 105 as an example of the update unit writes a history of communication (specifically, the identification number of the base station 200 that is at least the connection subject base station (the A base station)) with the base station 200, a connection trial for communication with which succeeds, into the total communication history table T1, and thus updates the total communication history table T1.

It is noted that the connection trial for communication in Step S3 may be made for bidirectional communication and may be made for one of the transmission and the reception. Therefore, the total communication history table T1 may be updated when either the transmission or the reception is performed.

Subsequent to Step S7, referring to the base station type management table T3 that is retained in the memory 160, the base station categorization management unit 1046 of the radio resource derivation unit 104 determines whether or not the base station 200 that is set to be the blocking-occurring base station (the D base station) is present (S8). In a case where the base station 200 that is set to be the blocking-occurring base station (the D base station) is not present (NO in S8), the processing by the wireless terminal 100 proceeds to Step S12.

On the other hand, in a case where the base station 200 that is set to be the blocking-occurring base station (the D base station) is present (YES in S8), the communication monitoring unit 1045 of the radio resource derivation unit 104 monitors whether or not the wireless reception unit 110 can receive a signal from the blocking-occurring base station (the D base station) (S9). More precisely, in Step S9, in a case where, based on the communication detection signal from the wireless reception unit 110, the communication monitoring unit 1045 can receive a signal from the base station 200 that is set to be the blocking-occurring base station (the D base station) (YES in S9), because the communication interruption that is based on blocking is canceled and thus the communication is resumed, there is a high probability that the blocking-occurring base station (the D base station) will be the connection standby base station (the B base station). Therefore, the base station categorization management unit 1046 sets the base station 200 that is set to be the blocking-occurring base station (the D base station), to be the connection standby base station (the B base station) (S10). It is noted that the base station categorization management unit 1046 may set the base station 200 that is set to be the blocking-occurring base station (the D base station), to be the connection standby candidate base station (the C base station) (S10).

On the other hand, in a case where the wireless reception unit 110 cannot receive a signal from the blocking-occurring base station (the D base station) (NO in S9), a state where the communication interruption that is based on blocking is attained and thus it is preferable that the setting of the blocking-occurring base station (the D base station) is maintained as is. Therefore, the base station categorization management unit 1046 maintains the setting of the blocking-occurring base station (the D base station) (S11).

Subsequent to Step S10 or Step S11, while the communication with the connection subject base station (the A base station) that starts or continues the communication in Step S7 is being performed, the connection candidate priority determination unit 1042 of the radio resource derivation unit 104 selects one connection standby base station (the B base station) that has the next highest priority for connection, which is second to the connection subject base station (the A base station) (S12). It is noted that the processing in Step S12 may be omitted in a case where the connection standby base station (the B base station) is derived in Step S2.

The connection standby management control unit 1044 of the radio resource derivation unit 104 instructs the radio resource allocation management unit 105 to perform the mutual communication of the control signal (refer to the above description) with the connection standby base station (the B base station). The radio resource allocation management unit 105 allocates an identification number of the connection standby base station (the B base station) that is selected in Step S12, to the wireless transmission unit 107 and the wireless reception unit 110, and performs a standby operation (more precisely, the mutual communication of the control signal) in preparation for communication connection to the connection standby base station (the B base station) (S13). For example, the transmission packet generation unit 106 generates the transmission packet that includes the control data for the uplink 21. The wireless transmission unit 107 transmits the transmission packet to the connection standby base station (the B base station) that is determined. Furthermore, for example, the wireless reception unit 110 receives the reception packet from the connection standby base station (the B base station) that is determined. The reception packet decoding unit 111 decodes the reception packet and obtains the control data for the downlink 22.

More precisely, the wireless terminal 100 inquires of the base station 200 (more precisely, the connection standby base station (the B base station)), which performs the standby operation (more precisely, the mutual communication of the control signal) in preparation for the communication connection, whether or not the resource block of the wireless frequency is allocable for the wireless communication with the wireless terminal 100. In a case where, in response to the inquiry from the wireless terminal 100, it is determined that the resource block of the wireless frequency is allocable, the connection standby base station (the B base station) transmits a message that the standby operation is successfully performed in preparation for the communication connection, to the wireless terminal 100. The connection standby management control unit 1044 acquires a result (the mutual communication success and failure signal) indicating whether or not the standby operation is successfully performed in preparation for the communication connection with the connection standby base station (the B base station), from the radio resource allocation management unit 105. The connection standby management control unit 1044 acquires a result (the mutual communication success and failure signal) indicating whether or not the mutual communication of the control signal with the connection standby base station (the B base station), from the radio resource allocation management unit 105. It is noted that in the present embodiment, it is assumed that the mutual communication of the control signal with the connection standby base station (the B base station) succeeds or fails.

In a case where the standby operation is successfully performed in preparation for the communication connection to the base station 200 (more precisely, the connection standby base station (the B base station)) that has the highest priority, the base station categorization management unit 1046 of the radio resource derivation unit 104 categorizes the base station 200 that is the standby state subject, as the connection standby base station (the B base station) and updates the base station type management table T3 (S13). Accordingly, for example, in a case where the communication interruption occurs due to the involvement of a blocking object in the propagation path to the connection subject base station (the A base station), because the standby operation can be performed in preparation for the communication connection to the connection standby base station (the B base station), the wireless terminal 100 can also secure a base station for backup for allocation to the transmission and reception (the communication) of data (for example, the control data or the user data (for example, the video data)), and can also guarantee the continuity of stable communication.

Subsequent to Step S13, the base station categorization management unit 1046 of the radio resource derivation unit 104 categories remaining (more precisely, (n−2)) base stations 200 that result from subtracting one connection subject base station (the A base station) and one connection standby base station (the B base station) from n base stations 200 that are derived in Step S2, as the connection standby candidate base station (the C base station), and thus updates the base station type management table T3 (S14). Accordingly, on the assumption that the standby operation in Step S13 is successfully performed, the description is provided, but, considering that there is also the probability of failure, the wireless terminal 100 can select one (for example, the base station 200 that has the shortest distance di and the great number of times of connection, which is among the connection standby candidate base stations (the C base stations)), from among the connection standby candidate base stations (the C base stations), and thus can also set the selected base station as the connection standby base station (the B base station).

In FIG. 9, subsequent to Step S14, the communication monitoring unit 1045 of the radio resource derivation unit 104 monitors whether or not a blocking object (for example, a person or a vehicle) or an indicator of the blocking is present on the propagation path to the connection subject base station (the A base station) that is currently performing communication (S15). The base station 200 according to the present embodiment performs wireless communication (for example, the 5th generation mobile communication system or Wireless Gigabit (WiGig (a registered trademark)) in a millimeter wave band) that uses the 5th generation mobile communication system (5G) (for example, a band of 28 GHz) or the millimeter wave. Because of this, the ability of a radio wave to propagate in a straight line is enhanced. Furthermore, in a case where the blocking object is involved in the propagation path to the connection subject base station (the A base station). The communication quality on the propagation path is drastically degraded (for example, throughput decreases or a packet error rate increases) and the communication between the wireless terminal 100 and the connection subject base station (the A base station) is interrupted. Furthermore, in a case where the 5G or the millimeter wave is not used in the base station 200, the ability of the radio wave to propagate in a straight line is not enhanced more than in the 5G or the millimeter wave, but, in a case where the blocking object is likely to be involved in the propagation path to the connection subject base station (the A base station). It is also considered that in the same manner, the communication quality on the propagation path is degraded (for example, the throughput decreases or the packet error rate increases). It is noted that in the 5th generation mobile communication system (5G), for example, the millimeter wave (for example, 30 GHz to 300 GHz), as well as a band of 15 GHz or a band of 28 GHz, but also, is included. WiGig (a registered trademark) is for a millimeter wave band of 60 GHz.

For example, in a case where the blocking object is involved in the propagation path to the connection subject base station (the A base station) that is currently performing communication with the wireless terminal 100 (YES in S15), the communication between the wireless terminal 100 and the connection subject base station (the A base station) is interrupted. In this case, the base station categorization management unit 1046 of the radio resource derivation unit 104 performs switching from the connection standby base station (the B base station) on standby in preparation for the communication connection in Step S13 to a new connection subject base station (the A base station), and further performs switching from the connection subject base station (the A base station) prior to the occurrence of the communication interruption to the blocking-occurring base station (the D base station) (S16). Accordingly, although blocking occurs between the wireless terminal 100 itself and the connection subject base station (the A base station) that is currently performing communication and thus the communication interruption occurs, the wireless terminal 100 performs switching to the connection subject base station (the B base station), and thus, after the switching, in the same manner, the wireless communication can also be continued that uses a high frequency band like 5G or the millimeter wave. Because of this, the loss of an opportunity for connection to a small cell in which the high-speed throughput is obtained can be avoided.

Subsequent to Step S16, in a case where the wireless terminal 100 moves a long distance, which exceeds a prescribed distance (a default value), from a current location (YES in S17), there is a need to again set the base station 200 with which the wireless terminal 100 communicates. Because of this, the processing by the wireless terminal 100 return to Step S1. On the other hand, in a case where the wireless terminal 100 does not move a long distance, which exceeds the prescribed distance, from the current location, or in a case where the blocking object is not involved in the propagation path to the connection subject base station (the A base station) that is currently performing communication in Step S15 (NO in Step S15), the base station categorization management unit 1046 of the radio resource derivation unit 104 maintains the setting of the connection subject base station (the A base station) that is currently performing communication (S18). Subsequent to Step S18, the processing by the wireless terminal 100 returns to Step S7 and the communication with the connection subject base station (the A base station) that is currently performing communication is continued.

As described above, it is possible that the wireless terminal 100 according to the present embodiment, for example, communicates with multiple base stations 200 that use 5G (a band of 28 GHz as an example of the 5th generation mobile communication system) or the millimeter wave (for example, 30 GHz to 300 GHz). At the time of the communication in the past with each of the base stations 200, the wireless terminal 100 accumulates at least the location information on the wireless terminal 100 and information pertaining to the base station 200 as the communication history, in the memory 160, and acquires current location information on the wireless terminal 100. Based on the current location information on the wireless terminal 100 and the communication histories that are accumulated in the memory 160, the wireless terminal 100 derives at least the connection subject base station (the A base station) that is used for the data communication and the connection standby base station (the B base station) that has the next highest priority for connection, which is second to the connection subject base station (the A base station), from among multiple base stations 200. The wireless terminal 100 perform the data communication in a case where the attempt for connection to the connection subject base station (the A base station) succeeds, and performs switching from the connection subject base station (A) that is used for the data communication to the connection standby base station (the B base station) that is derived, in a case where some type of blocking object (for example, a person or a vehicle) is involved in the propagation path to the connection subject base station (the A base station) that is performing the data communication, and thus where the communication with the connection subject base station (the A base station) is interrupted.

Accordingly, in a case where the blocking occurs on the propagation path to the base station 200 that makes up the wireless communication system 10 which is illustrated in FIG. 1, or in a case where an indicator of the blocking is recognized, the wireless terminal 100 can perform switching to any other base station 200 (that is, the base station 200 that is derived, by the wireless terminal 100, as the connection standby base station (the B base station)), that possibly continues wireless communication and can allocate the base station 200 for the data communication. Therefore, the wireless terminal 100, for example, performs switching to the base station 200 (the connection standby base station (the B base station)) that uses the same millimeter wave, without making a connection to the macro base station that uses LTE where lower speed throughput is obtained than in the millimeter wave, due to the interruption of the communication with the base station 200 that uses the millimeter wave, and can continue the communication. Because of this, a reduction in the probability of connection to a cell where high-speed throughput is obtained can be suppressed. Therefore, the wireless terminal 100 can derive any one of the base stations 200 as the connection subject base station (the A base station) or the connection subject base station (the B base station). Because of this, for example, there is no need to conduct a search (a cell search) of the base station 200 using a well-known method. More precisely, the wireless terminal 100 does not need to sequentially scan the Radio Access Technology (RAT) that is employable and to search for the base station 200 that is positioned in the vicinity of the wireless terminal 100. In this case, the wireless terminal 100 does not need to conduct as cell searches as many as there are Radio Access Technologies (RATs) that are present within a network that is configured by the wireless communication system 10 that is illustrated in FIG. 1. For this reason, the wireless terminal 100 can reduce processing load or processing time for searching for the base station 200 that is a connection destination and can suppress an increase in power consumption.

Furthermore, the wireless terminal 100 derives the connection subject base station (the A base station) and the connection standby base station (the B base station) in order of decreasing the number of times of allocation, among the prescribed number n of communication histories in which the distance di that is based on current location information on the wireless terminal 100 and the location information in the wireless terminal 100, which is included in the communication history in the past, is short. Accordingly, the wireless terminal 100 can derive the connection subject base station (the A base station) and the connection standby base station (the B base station) in order of decreasing the number of times of use of the base station 200, among the communication histories in which the distance di is short (in other words, a distance between a current location and the location at the time of the wireless communication in the past is short), and can stably communicate with the suitable base station 200 that has the communication history at a current location.

Furthermore, in a case where the distance di is at or below the prescribed threshold dth, the wireless terminal 100 derives the connection subject base station (the A base station) and the connection standby base station (the B base station) in order of decreasing the number of times of allocation of the base station 200, among the prescribed number n of communication histories in the past. Accordingly, it is possible that, in a case where the communication history in which the distance di is greater than the prescribed threshold dth (in other words, the communication history in a case where there is a long distance between the location of the wireless terminal 100 at the time of the wireless communication in the past and a current location) is excluded, and that the high-level communication history table T2 is generated. Therefore, the wireless terminal 100 can perform allocation of a more suitable radio resource (for example, the identification number of the base station 200) according to the environment of the network that is provided in the vicinity of a current location.

Furthermore, the wireless terminal 100 further accumulates information on an amount of data communication with the connection subject base station (the A base station), as the communication history, and derives the connection subject base station (the A base station) and the connection standby base station (the B base station) in order of decreasing the amount of data communication with the base station 200, among the prescribed number n of communication histories in the past in which the distance di is short. Accordingly, it is possible that the wireless terminal 100, for example, performs allocation with a preference for the base station 200 that possibly provides the small cell (in other words, the cell that has a probability that the amount of communication data will be increased) where the high-speed throughput is obtained, as is the case with 5G (a band of 28 GHz as an example of the 5th generation mobile communication system) or the millimeter wave (for example, 30 GHz to 300 GHz), and the amount of suitable communication data is easy to perform.

Furthermore, when performing the data communication with the connection subject base station (the A base station) that is derived, the wireless terminal 100 updates information pertaining to the connection subject base station (the A base station) pertaining to the data communication, as the communication history that is associated with current location information on the wireless terminal 100, and then accumulates the updated information in the memory 160. Accordingly, the wireless terminal 100 can accumulate the communication history in which the identification number of the connection subject base station (the A base station) that is a communication partner of the wireless terminal 100 itself is associated with the location at the time of the communication, as the communication record that is generated each time the wireless communication is actually performed, in the memory 160, and thus can perform learning.

Furthermore, in a case where the attempt for the connection to the connection subject base station (the A base station) that is derived fails, the wireless terminal 100 derives the connection standby base station (the B base station) that is derived, as the connection subject base station (the A base station) that is to be used for the data communication. Accordingly, although the base station 200 is derived as the base station 200 that has the highest priority for connection, based on the distance di, in a case where a radio resource is occupied by any other wireless terminal, the wireless terminal 100 can immediately set the connection standby base station (the B base station) that has the next highest priority for connection, as the connection subject base station (the A base station). Because of this, the communication in accordance with the communication environment in the vicinity of the location of the wireless terminal 100 can be adaptively performed.

Furthermore, the information pertaining to the base station 200 includes information that the blocking-occurring base station (the D base station) that is based on the interruption of the communication of the wireless terminal 100 is present. In a case where a signal from the blocking-occurring base station (the D base station) can be received, the wireless terminal 100 derives the communication interruption base station (the D base station) as the connection standby base station (the B base station) or the connection standby candidate base station (the C base station) that has the next highest priority for connection, which is second to the connection standby base station (the B base station). Accordingly, for example, a blocking object (for example, a person or a vehicle) is momentarily involved, and thus the wireless terminal 100 can receive a signal from the base station 200 that is set to be graded down to the blocking-occurring base station (the D base station). Thus, it is considered that there is a high probability that a primary cause of the blocking of the propagation path to the blocking-occurring base station (the D base station) will be reduced. Therefore, the wireless terminal 100 can set the blocking-occurring base station (the D base station) as a base station for backup as a precaution against the occurrence of the interruption of the communication with the connection subject base station (the A base station) that is currently performing communication.

Furthermore, based on n (n is an integer that is equal to or greater than 2) communication histories in which the distance di that is based on the location information on the wireless terminal 100 and the location information on the wireless terminal, which is included in the communication history in the past is short, the wireless terminal 100 derives one or more connection standby candidate base stations (the C base stations) that have the next highest priority for connection, which are second to the connection standby base station (the B base station). Accordingly, in a case where the interruption of the communication with the connection subject base station (the A base station), is currently performing communication, occurs, the wireless terminal 100 sets the connection standby base station (the B base station) to be graded up to a new connection subject base station (the A base station). Because of this, the base station 200 can be secured that can be the connection standby base station (the B base station) for backup, which corresponds to the new connection subject base station (the A base station).

Furthermore, in a case where the interruption of the communication with the connection subject base station (the A base station) is detected, the wireless terminal 100 performs switching from the connection subject base station (the A base station) to the blocking-occurring base station (the D base station) that has a lower priority for connection to the wireless terminal 100 than the connection subject base station (the A base station) and the connection standby base station (the B base station). Accordingly, for example, the base station 200 that is not the connection subject base station (the A base station) only due to the occurrence of the momentary blocking has a high probability of being able to newly communicate with the wireless terminal 100, in a case where the blocking disappears (for example, a person passes momentarily, and only with this, the person is recognized as moving). Therefore, instead of being associated with a base station that is not used for communication from now on, the wireless terminal 100 can set the connection subject base station (the A base station) as the connection standby base station (the B base station) or the blocking-occurring base station (the D base station), as the base station 200, that is set to be graded up to the connection standby candidate base station (the C base station).

Furthermore, the location information on the wireless terminal 100, for example, is a combination of pieces of effective (latitude, longitude, altitude) information, and the wireless terminal 100 derives the distance di with a preference for, for example, the altitude, from among the latitude, the longitude, and the altitude. Although the latitudes or the longitudes in the location information on the wireless terminal 100 are the same, when the altitudes are different, in some cases, a communication environment is greatly different. Therefore, the wireless terminal 100 calculates the distance di with a preference for the altitude (for example, refer to Equation (3)), and thus can derive the connection subject base station (the A base station) and the connection standby base station (the B base station) that possibly provide the communication environment which is appropriate for a current location of the wireless terminal 100 itself.

Furthermore, in the present embodiment, in a case where the wireless terminal 100 is positioned indoors or in the vicinity of a border between the outside and the inside of a building, the location information on the wireless terminal 100 may be location information that is obtained by relative distances from multiple BLE beacons 60 that are installed indoors. Accordingly, in a case where the wireless terminal 100 is positioned outdoors, for example, a location of the wireless terminal 100 can be specified with information that is (latitude, longitude, altitude) that is calculated by the GPS reception unit 102. Furthermore, on the other hand, in a case where the wireless terminal 100 is positioned indoors or in the vicinity of a border between the outside and the inside of a building, for example, a location of the wireless terminal 100 can be specified with information that is the relative distance from the BLE beacon 60, which is calculated by the BLE reception unit 122.

Modification Example of the Present Embodiment

Figure 10:
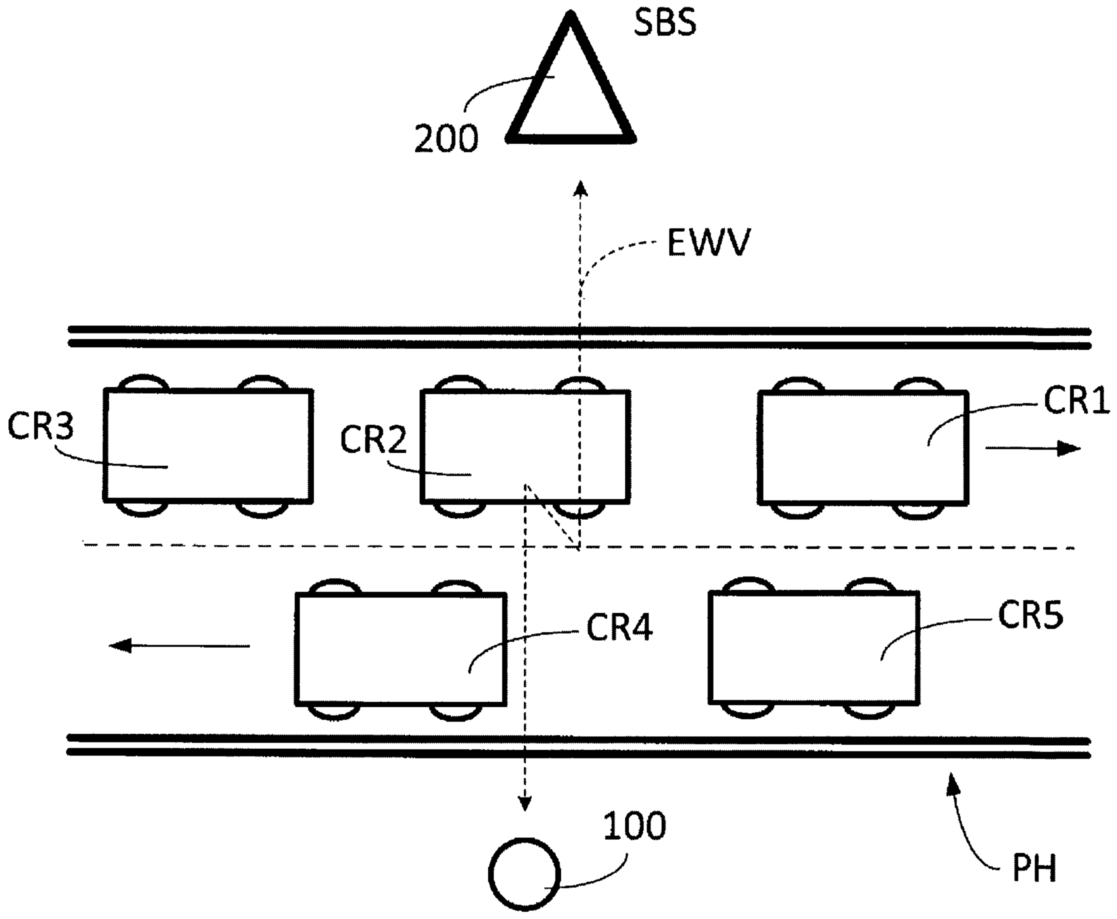
FIG. 10 is a descriptive diagram illustrating an example of a scene in which blocking occurs frequently on a propagation path for a radio wave between the wireless terminal and the base station.

In a modification example (hereinafter referred to "modification example") of the present embodiment, a case where a blocking object such as a person or a vehicle is frequently involved in the propagation path between the wireless terminal 100 and the connection subject base station (the A base station) is exemplarily described (refer to FIG. 10). FIG. 10 is a descriptive diagram illustrating an example of a scene in which blocking occurs frequently on a propagation path for a radio wave EWV between the wireless terminal 100 and the base station 200. As illustrated in FIG. 10, it is assumed that, across one road PH, the location of the wireless terminal 100 is positioned in the opposite direction with a road PH interposed between the wireless terminal 100 and the base station 200 that is set to be the connection subject base station (the A base station) that is performing communication.

Vehicles CR1, CR2, CR3, CR4, and CR5 are various types of vehicles (for example, passenger vehicles, buses, trucks, large-sized sightseeing buses, and wreckers) (it goes without saying that no limitation to these is imposed). For example, the ability of the radio wave EWV to propagate in a straight line is much more enhanced in a high frequency band like 5G (a band of 28 GHz as an example of the 5th generation mobile communication system) or the millimeter wave (for example, a band of 30 GHz to 300 GHz). For this reason, in a case a blocking object is frequently involved in the propagation path for the radio wave EWV between the wireless terminal 100 and the connection subject base station (the A base station) that is currently performing communication (refer to FIG. 10), the connection subject base station (the A base station) is set, by the wireless terminal 100, to be graded down to the blocking-occurring base station (the D base station), each time blocking objects such as the vehicle CR1 to CR5 are involved.

Thus, in the modification example, the wireless terminal 100 uses the frequent involvement of the blocking object to determine a priority when deriving the connection subject base station (the A base station). Specifically, for retention, the wireless terminal 100 writes the number of times of setting the blocking-occurring base station (the D base station) for every base station 200, into information pertaining to the base station 200, which is included in the communication history. When determining the priority in deriving the connection subject base station (the A base station), the wireless terminal 100 subtracts the number of times of setting the blocking-occurring base station (the D base station) for every base station 200, which is included in the communication history, from the number of times of setting as the connection subject base station (the A base station) in n communication histories that are extracted in order of increasing the distance di.

This results from considering a probability that the wireless terminal 100 will be prevented from continuing stable communication, in a case where the location of the base station 200 is positioned at a location where, for the wireless terminal 100, the blocking occurs frequently or repeatedly although the number of times of connection to the wireless terminal 100 is great.

Furthermore, in a case where, within a short time (for example, a default value) when consideration as the same communication occurs, the base station 200 is present that is set to be the connection subject base station (the A base station) in the following order: the blocking-occurring base station (the D base station), the connection standby base station (the B base station), the connection subject base station (the A base station) or the blocking-occurring base station (the D base station), the connection standby candidate base station (the C base station), the connection standby base station (the B base station), the connection subject base station (the A base station), the wireless terminal 100 does not take into consideration a value of the number of times of connection to the base station 200 when determining a priority for connection to the base station 200 (more precisely, the value is set to zero). In this case, connection time as well as a type of base station 200 is included, as the information pertaining to the base station 200, in the communication history. Accordingly, although an attempt is made to perform wireless communication with the base station 200 that varies in type within a short time, because it is difficult to continue stable communication, the wireless terminal 100 can initiatively avoid selection of the base station 200 that has a high probability of causing such difficulty.

Furthermore, the wireless terminal 100, for example, may retain the time for connection to the base station 200 and the number of times of connection to the connection subject base station (the A base station), the time for the connection to which is shorter than a prescribed time (for example, one second) in the communication history. In this case, when determining a priority for connection to the base station 200, the wireless terminal 100 does not take into consideration a value of the number of times of connection to the connection subject base station (the A base station), the time for the connection to which is shorter than the prescribed time (for example, one second) (more precisely, the time is set to zero). Accordingly, although an attempt is made to perform the wireless communication with the base station 200 that does not become the connection subject base station (the A base station) within a short time, because it is difficult to continue stable communication, the wireless terminal 100 can initiatively avoid selection of the base station 200 that has a high probability of causing such difficulty.

As described above, the wireless terminal 100 in the modification example further includes information that is the number of times of occurrence of the interruption of the communication between the connection subject base station (the A base station) and the wireless terminal 100, as the communication history. Based on a difference between the number of times of allocation and the information that is the number of times of occurrence of the interruption of the communication, the wireless terminal 100 derives the connection subject base station (the A base station) and the connection standby base station (the B base station), from the n communication histories in which the distance di is short. Accordingly, although the number of times of connection to the wireless terminal 100 is great, the wireless terminal 100 can initiatively exclude the base station 200, which is positioned at a location where, for the wireless terminal 100, the blocking occurs frequently or repeatedly, from being employed as the connection subject base station (the A base station) or the connection standby base station (the B base station), and can reduce a probability that the wireless terminal 100 will be prevented from continuing stable communication.

Various embodiments are described above with reference to the drawings, but it goes without saying that the present invention is not limited to such examples. It is apparent to a person of ordinary skill in the art that various modification examples or revision examples can be contemplated within the scope of a claim, and, of course, it is understood that these also justifiably fall within the technical scope of the present invention. Furthermore, the constituent elements in the embodiments, which are described above, may be voluntarily combined within the scope that does not depart from the gist of the invention.

It is noted that the present application claims the benefit of earlier filing date and right of priority to Japanese Patent Application (No. 2016-241260) filed on Dec. 13, 2016, the contents of which are incorporated by reference herein in its entirety.

INDUSTRIAL APPLICABILITY

The present disclosure is useful as a wireless terminal and a base station switching method that perform quick switching to any other base station that possibly continues wireless communication, allocate a base station, and suppress a reduction in a probability of connection to a cell where high-speed throughput is obtained, even in a case where blocking occurs on a propagation path to a base station.

REFERENCE SIGNS LIST

10 wireless communication system
21 uplink
22 downlink
50 GPS satellite
60 BLE beacon
100 wireless terminal
101 GPS antenna
102 GPS reception unit
103 location information generation unit
104 radio resource derivation unit
105 radio resource allocation management unit
106 transmission packet generation unit
107 wireless transmission unit
108 transmission antenna
109 reception antenna
110 wireless reception unit
111 reception packet decoding unit
121 BLE antenna
122 BLE reception unit
150 processor
160 memory
200 base station, A base station, B base station, C base station, D base station
1041 distance di computation unit
1042 connection candidate priority determination unit
1043 connection trial management control unit
1044 connection standby management control unit
1045 communication monitoring unit
1046 base station categorization management unit
T1 total communication history table
T2 high-level communication history table
T3 base station type management table

The invention claimed is:

1. A wireless terminal that is capable of performing communication with a plurality of base stations, the wireless terminal comprising:

a storage configured to store a communication history having at least location information on the wireless terminal and information on the plurality of base stations, wherein the information on the plurality of base stations includes a communication interruption history of the plurality of base stations; and a processor coupled to the storage and configured to:

acquire the location information on the wireless terminal;

select at least a connection target base station for data communication and a connection standby base station from among the plurality of base stations, based on the acquired location information on the wireless terminal and the communication history, the connection target base station having the highest priority for connection, and the connection standby base station having the second highest priority for connection among the plurality of base stations;

establish the data communication with the connection target base station;

in response to the data communication with the connection target base station being interrupted, switch to establish the data communication with the connection standby base station; and in response to receiving a signal from one of the plurality of base stations, which has experienced a communication interruption according to the communication interruption history, select said one base station as the connection standby base station or as a connection standby candidate base station that has the next highest priority for connection relative to the connection standby base station.

2. The wireless terminal according to claim 1, wherein the priority of the connection target base station and the connection standby base station is defined by a number of times the plurality of the base stations are allocated for communication with the wireless terminal.

3. The wireless terminal according to claim 1, wherein the connection target base station and the connection standby base station are selected from an “n” subset of the plurality of base stations having n communication histories (n is an integer that is equal to or greater than 2), in which a distance based on the acquired location information on the wireless terminal and the location information on the wireless terminal in the communication history is equal to or below a threshold.

4. The wireless terminal according to claim 3, wherein the location information on the wireless terminal has a latitude, a longitude, and an altitude indicating a location of the wireless terminal, and wherein the processor derives the distance with a preference for the altitude instead of the latitude and the longitude.

5. The wireless terminal according to claim 1, wherein the communication history includes information on an amount of data communication with each of the plurality of base stations, and the priority of the connection subject base station and the connection standby base station is defined by the amount of data communication.

6. The wireless terminal according to claim 1, wherein the processor is configured to:

in response to establishing the data communication with the connection target base station, update the communication history of the connection target base station in the storage.

7. The wireless terminal according to claim 1, wherein the processor is configured to:

in response to failing to establish the data communication with the connection target base station, select the connection standby base station as the connection target base station.

8. The wireless terminal according to claim 1, wherein the connection standby candidate base station is selected from an “n” subset of the plurality of base stations having n communication histories (n is an integer that is equal to or greater than 2), in which a distance based on the acquired location information on the wireless terminal and the location information on the wireless terminal in the communication history is equal to or below a threshold.

9. The wireless terminal according to claim 1, wherein the processor is configured to:

detect a communication interruption to the data communication with the connection target base station, and switch to establish the data communication with one of the plurality of base stations, which has experienced a communication interruption according to the communication interruption history and which has a lower priority than the connection target base station and the connection standby base station.

10. The wireless terminal according to claim 1, wherein the communication history includes information on a number of times the data communication is interrupted between the wireless terminal and the plurality of base stations.

11. A base station switching method in a wireless terminal that is capable of performing communication with a plurality of base stations, the base station switching method comprising:

storing a communication history having at least location information on the wireless terminal and information on the plurality of base stations, wherein the information on the plurality of base stations includes a communication interruption history of the plurality of base stations;

acquiring the location information on the wireless terminal;

selecting at least a connection target base station for data communication and a connection standby base station from among the plurality of base stations, based on the acquired location information on the wireless terminal and the communication history, the connection target base station having the highest priority for connection, and the connection standby base station having the second highest priority for connection among the plurality of base stations;

establishing the data communication with the connection target base station;

in response to the data communication with the connection target base station being interrupted, switching to establish the data communication with the connection standby base station; and in response to receiving a signal from one of the plurality of base stations, which has experienced a communication interruption according to the communication interruption history, selecting said one base station as the connection standby base station or as a connection standby candidate base station that has the next highest priority for connection relative to the connection standby base station.

12. A wireless terminal that is capable of performing communication with a plurality of base stations, the wireless terminal comprising:

a storage configured to store a communication history having at least location information on the wireless terminal and information on the plurality of base stations, wherein the information on the plurality of base stations includes a communication interruption history of the plurality of base stations; and a processor coupled to the storage and configured to:

acquire the location information on the wireless terminal;

select at least a connection target base station for data communication and a connection standby base station from among the plurality of base stations, based on the acquired location information on the wireless terminal and the communication history, the connection target base station having the highest priority for connection, and the connection standby base station having the second highest priority for connection among the plurality of base stations;

establish the data communication with the connection target base station;

in response to the data communication with the connection target base station being interrupted, switch to establish the data communication with the connection standby base station; and in response to detecting a communication interruption to the data communication with the connection target base station, switch to establish the data communication with one of the plurality of base stations, which has experienced a communication interruption according to the communication interruption history and which has a lower priority than the connection target base station and the connection standby base station.

13. The wireless terminal according to claim 12, wherein the priority of the connection target base station and the connection standby base station is defined by a number of times the plurality of the base stations are allocated for communication with the wireless terminal.

14. The wireless terminal according to claim 12, wherein the connection target base station and the connection standby base station are selected from an "n" subset of the plurality of base stations having n communication histories (n is an integer that is equal to or greater than 2), in which a distance based on the acquired location information on the wireless terminal and the location information on the wireless terminal in the communication history is equal to or below a threshold.

15. The wireless terminal according to claim 12, wherein the communication history includes information on an amount of data communication with each of the plurality of base stations, and the priority of the connection subject base station and the connection standby base station is defined by the amount of data communication.

16. The wireless terminal according to claim 12, wherein the processor is configured to:

in response to establishing the data communication with the connection target base station, update the communication history of the connection target base station in the storage.

17. The wireless terminal according to claim 12, wherein the processor is configured to:

in response to failing to establish the data communication with the connection target base station, select the connection standby base station as the connection target base station.

18. A base station switching method in a wireless terminal that is capable of performing communication with a plurality of base stations, the base station switching method comprising:

storing a communication history having at least location information on the wireless terminal and information on the plurality of base stations, wherein the information on the plurality of base stations includes a communication interruption history of the plurality of base stations;

acquiring the location information on the wireless terminal;

selecting at least a connection target base station for data communication and a connection standby base station from among the plurality of base stations, based on the acquired location information on the wireless terminal and the communication history, the connection target base station having the highest priority for connection, and the connection standby base station having the second highest priority for connection among the plurality of base stations;

establishing the data communication with the connection target base station;

in response to the data communication with the connection target base station being interrupted, switching to establish the data communication with the connection standby base station; and in response to detecting a communication interruption to the data communication with the connection target base station, switch to establish the data communication with one of the plurality of base stations, which has experienced a communication interruption according to the communication interruption history and which has a lower priority than the connection target base station and the connection standby base station.

* * * * *